(12) United States Patent
Sankar et al.

(10) Patent No.: US 10,694,467 B2
(45) Date of Patent: Jun. 23, 2020

(54) DYNAMIC CLOCK SWITCHING WITHIN A TRANSMISSION TIME INTERVAL

(71) Applicant: QUALCOMM Incorporated, San Diego, CA (US)

(72) Inventors: Hari Sankar, San Diego, CA (US); Alexei Yurievitch Gorokhov, San Diego, CA (US); Michael Lee McCloud, San Diego, CA (US); Li Zhang, San Diego, CA (US); Brian Clarke Banister, San Diego, CA (US); Jittra Jootar, San Diego, CA (US); Joseph Binamira Soriaga, San Diego, CA (US); Afshin Shiravi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/141,699

(22) Filed: Sep. 25, 2018

(65) Prior Publication Data

US 2019/0098594 A1 Mar. 28, 2019

Related U.S. Application Data

(60) Provisional application No. 62/564,607, filed on Sep. 28, 2017.

(51) Int. Cl.
*H04W 52/02* (2009.01)
*H04W 56/00* (2009.01)
(Continued)

(52) U.S. Cl.
CPC ............ *H04W 52/0287* (2013.01); *H04J 1/00* (2013.01); *H04L 1/1812* (2013.01);
(Continued)

(58) Field of Classification Search
CPC ............ H04W 52/0287; H04W 52/029; H04W 52/0293; H04W 52/0229; H04W 52/0251;
(Continued)

(56) References Cited

U.S. PATENT DOCUMENTS

| 5,517,638 A | 5/1996 | Szczepanek et al. |
| 2004/0162046 A1* | 8/2004 | Yamauchi ................ G04G 3/02 455/260 |
| 2008/0126823 A1* | 5/2008 | Kuhns ....................... H04L 7/02 713/501 |

FOREIGN PATENT DOCUMENTS

| EP | 1395072 A1 | 3/2004 |
| WO | WO-2008042813 A2 | 4/2008 |

OTHER PUBLICATIONS

International Search Report and Written Opinion—PCT/US2018/052824—ISA/EPO—Jan. 14, 2019.

* cited by examiner

*Primary Examiner* — Joshua Kading
(74) *Attorney, Agent, or Firm* — Holland & Hart LLP

(57) ABSTRACT

Methods, systems, and devices for wireless communications are described. A user equipment (UE) may support dynamic clock switching within a transmission time interval (TTI) to allow for more efficient and flexible processing within the TTI. In particular, a user equipment (UE) may be configured to use multiple clock speeds for processing signals within a TTI, and the UE may determine a clock speed to use for processing data within a TTI based on control information received from a base station. For example, the UE may determine an amount of time available for processing data based on the control information received from the base station, and the UE may adjust its clock speed to finish processing the data in the determined amount of time.

30 Claims, 13 Drawing Sheets

(51) Int. Cl.
*H04L 1/18* (2006.01)
*H04J 1/00* (2006.01)

(52) U.S. Cl.
CPC ..... *H04W 52/029* (2013.01); *H04W 52/0229* (2013.01); *H04W 52/0235* (2013.01); *H04W 52/0251* (2013.01); *H04W 52/0293* (2013.01); *H04W 56/0015* (2013.01)

(58) Field of Classification Search
CPC .......... H04W 52/0235; H04W 56/0015; H04L 1/1812; H04J 1/00
See application file for complete search history.

DYNAMIC CLOCK SWITCHING WITHIN A TRANSMISSION TIME INTERVAL

CROSS REFERENCES

The present application for patent claims the benefit of U.S. Provisional Patent Application No. 62/564,607 by SANKAR et al., entitled "DYNAMIC CLOCK SWITCHING WITHIN A TRANSMISSION TIME INTERVAL," filed Sep. 28, 2017, assigned to the assignee hereof and expressly incorporated by reference in its entirety.

BACKGROUND

The following relates generally to wireless communication and more specifically to dynamic clock switching within a transmission time interval (TTI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems (e.g., 5G systems), a UE may process data received from a base station or data to be transmitted to a base station in accordance with a clock speed. Conventional techniques at a UE for processing data may be deficient.

SUMMARY

The described techniques relate to improved methods, systems, devices, or apparatuses that support dynamic clock switching within a transmission time interval (TTI). In particular, a user equipment (UE) may be configured to use multiple clock speeds for processing signals within a TTI, and the UE may determine a clock speed to use for processing data within a TTI based on control information received from a base station. For example, the UE may determine an amount of time available for processing data based on control information received from a base station, and the UE may adjust its clock speed within a TTI to finish processing the data in the determined amount of time.

A method for wireless communication is described. The method may include receiving control information in a first TTI, receiving data in a second TTI, determining a voltage or clock speed for processing at least a portion of the data received in the second TTI based at least in part on the control information received in the first TTI, the voltage or clock speed being associated with a change in power consumption in the second TTI compared to the first TTI, and processing at least the portion of the data received in the second TTI using the determined voltage or clock speed.

An apparatus for wireless communication is described. The apparatus may include means for receiving control information in a first TTI, means for receiving data in a second TTI, means for determining a voltage or clock speed for processing at least a portion of the data received in the second TTI based at least in part on the control information received in the first TTI, the voltage or clock speed being associated with a change in power consumption in the second TTI compared to the first TTI, and means for processing at least the portion of the data received in the second TTI using the determined voltage or clock speed.

Another apparatus for wireless communication is described. The apparatus may include a processor, memory in electronic communication with the processor, and instructions stored in the memory. The instructions may be operable to cause the processor to receive control information in a first TTI, receive data in a second TTI, determine a voltage or clock speed for processing at least a portion of the data received in the second TTI based at least in part on the control information received in the first TTI, the voltage or clock speed being associated with a change in power consumption in the second TTI compared to the first TTI, and process at least the portion of the data received in the second TTI using the determined voltage or clock speed.

A non-transitory computer readable medium for wireless communication is described. The non-transitory computer-readable medium may include instructions operable to cause a processor to receive control information in a first TTI, receive data in a second TTI, determine a voltage or clock speed for processing at least a portion of the data received in the second TTI based at least in part on the control information received in the first TTI, the voltage or clock speed being associated with a change in power consumption in the second TTI compared to the first TTI, and process at least the portion of the data received in the second TTI using the determined voltage or clock speed.

In some examples of the method, apparatus, and non-transitory computer-readable medium described above, determining the voltage or clock speed for processing at least the portion of the data received in the second TTI further includes determining that the control information indicates a location of reference signals in the second TTI, and determining the voltage or clock speed for processing at least the portion of the data received in the second TTI based at least in part on the location of the reference signals in the second TTI.

In some examples of the method, apparatus, and non-transitory computer-readable medium described above, determining the voltage or clock speed for processing at least the portion of the data received in the second TTI further includes determining that the control information indicates a response time for providing hybrid automatic repeat request (HARQ) feedback on the data received in the second TTI, and determining the voltage or clock speed for processing at least the portion of the data received in the second TTI based at least in part on the response time.

In some examples of the method, apparatus, and non-transitory computer-readable medium described above, the determined voltage or clock speed may be different from a voltage or clock speed used to process the control information. In some examples of the method, apparatus, and non-transitory computer-readable medium described above, the determined voltage or clock speed may be greater than or lower than a voltage or clock speed used to process the control information received in the first TTI. In some examples of the method, apparatus, and non-transitory computer-readable medium described above, the voltage or clock speed used to process the control information received in the first TTI may be predefined. In some examples of the method, apparatus, and non-transitory computer-readable medium described above, the determined voltage or clock speed may be greater than or lower than a voltage or clock speed used to process reference signals received in the second TTI. In some examples of the method, apparatus, and non-transitory computer-readable medium described above, the voltage or clock speed used to process the reference signals received in the second TTI may be predefined.

In some examples of the method, apparatus, and non-transitory computer-readable medium described above, the first TTI and the second TTI include a same TTI and determining the voltage or clock speed includes determining the voltage or clock speed for processing at least the portion of the data received in the same TTI. Some examples of the method, apparatus, and non-transitory computer-readable medium described above may further include processes, features, means, or instructions for processing control information and reference signals received in the same TTI using a first voltage or clock speed, and processing at least the portion of the data received in the same TTI using a second voltage or clock speed, the second voltage or clock speed being the determined voltage or clock speed.

Some examples of the method, apparatus, and non-transitory computer-readable medium described above may further include processes, features, means, or instructions for processing reference signals received in the second TTI using a voltage or clock speed different from the determined voltage or clock speed, performing channel estimation based at least in part on the processed reference signals, and processing at least the portion of the data received in the second TTI using the determined voltage or clock speed based at least in part on the channel estimation.

A method for wireless communication is described. The method may include receiving an indication to use multiple processing voltages or clock speeds in processing control information and data in a TTI, receiving control information and data in a TTI, and processing, in accordance with the indication, at least a portion of the data received in the TTI using a different voltage or clock speed from an initial voltage or clock speed used to process the control information.

An apparatus for wireless communication is described. The apparatus may include means for receiving an indication to use multiple processing voltages or clock speeds in processing control information and data in a TTI, means for receiving control information and data in a TTI, and means for processing, in accordance with the indication, at least a portion of the data received in the TTI using a different voltage or clock speed from an initial voltage or clock speed used to process the control information.

Another apparatus for wireless communication is described. The apparatus may include a processor, memory in electronic communication with the processor, and instructions stored in the memory. The instructions may be operable to cause the processor to receive an indication to use multiple processing voltages or clock speeds in processing control information and data in a TTI, receive control information and data in a TTI, and process, in accordance with the indication, at least a portion of the data received in the TTI using a different voltage or clock speed from an initial voltage or clock speed used to process the control information.

A non-transitory computer readable medium for wireless communication is described. The non-transitory computer-readable medium may include instructions operable to cause a processor to receive an indication to use multiple processing voltages or clock speeds in processing control information and data in a TTI, receive control information and data in a TTI, and process, in accordance with the indication, at least a portion of the data received in the TTI using a different voltage or clock speed from an initial voltage or clock speed used to process the control information.

In some examples of the method, apparatus, and non-transitory computer-readable medium described above, receiving the indication further includes receiving the indication to use multiple processing voltages or clock speeds in processing control information and data in the TTI when a response time for providing HARQ feedback on the data received in the TTI may be below a threshold. In some examples of the method, apparatus, and non-transitory computer-readable medium described above, receiving the indication further includes receiving the indication to use multiple processing voltages or clock speeds in processing control information and data in the TTI when reference signals received in the TTI are received in or after a predetermined symbol of the TTI. In some examples of the method, apparatus, and non-transitory computer-readable medium described above, receiving the indication further includes receiving the indication to use multiple processing voltages or clock speeds in processing control information and data in the TTI when a processing time scheduled for processing the data in the TTI is below a threshold.

Some examples of the method, apparatus, and non-transitory computer-readable medium described above may further include processes, features, means, or instructions for processing control information and reference signals received in the TTI using the initial voltage or clock speed, and processing at least the portion of the data received in the TTI using the different voltage or clock speed. Some examples of the method, apparatus, and non-transitory computer-readable medium described above may further include processes, features, means, or instructions for performing channel estimation based at least in part on the processed reference signals, and processing at least the portion of the data received in the TTI using the different voltage or clock speed based at least in part on the channel estimation.

A method for wireless communication is described. The method may include receiving control information in a first TTI, identifying data to transmit in a second TTI, determining a voltage or clock speed for processing at least a portion of the data to transmit in the second TTI based at least in part on the control information received in the first TTI, the voltage or clock speed being associated with a change in power consumption in the second TTI compared to the first TTI, processing at least the portion of the data to transmit in the second TTI using the determined voltage or clock speed, and transmitting the processed data in the second TTI.

An apparatus for wireless communication is described. The apparatus may include means for receiving control information in a first TTI, means for identifying data to transmit in a second TTI, means for determining a voltage or clock speed for processing at least a portion of the data to transmit in the second TTI based at least in part on the control information received in the first TTI, the voltage or clock speed being associated with a change in power consumption in the second TTI compared to the first TTI, means for processing at least the portion of the data to transmit in the second TTI using the determined voltage or clock speed, and means for transmitting the processed data in the second TTI.

Another apparatus for wireless communication is described. The apparatus may include a processor, memory in electronic communication with the processor, and instructions stored in the memory. The instructions may be operable to cause the processor to receive control information in a first TTI, identify data to transmit in a second TTI, determine a voltage or clock speed for processing at least a portion of the data to transmit in the second TTI based at least in part on the control information received in the first TTI, the voltage or clock speed being associated with a change in power consumption in the second TTI compared to the first TTI, process at least the portion of the data to transmit in the second TTI using the determined voltage or clock speed, and transmit the processed data in the second TTI.

A non-transitory computer readable medium for wireless communication is described. The non-transitory computer-readable medium may include instructions operable to cause a processor to receive control information in a first TTI, identify data to transmit in a second TTI, determine a voltage or clock speed for processing at least a portion of the data to transmit in the second TTI based at least in part on the control information received in the first TTI, the voltage or clock speed being associated with a change in power consumption in the second TTI compared to the first TTI, process at least the portion of the data to transmit in the second TTI using the determined voltage or clock speed, and transmit the processed data in the second TTI.

In some examples of the method, apparatus, and non-transitory computer-readable medium described above, determining the voltage or clock speed for processing at least the portion of the data to transmit in the second TTI further includes determining that the control information indicates a processing time for processing data to transmit in the second TTI, and determining the voltage or clock speed for processing at least the portion of the data to transmit in the second TTI based at least in part on the indicated processing time.

In some examples of the method, apparatus, and non-transitory computer-readable medium described above, determining the voltage or clock speed for processing at least the portion of the data to transmit in the second TTI further includes determining that the control information indicates a location of reference signals in the second TTI, and determining the voltage or clock speed for processing at least the portion of the data to transmit in the second TTI based at least in part on the location of the reference signals in the second TTI.

In some examples of the method, apparatus, and non-transitory computer-readable medium described above, the determined voltage or clock speed may be different from a voltage or clock speed used to process the control information. In some examples of the method, apparatus, and non-transitory computer-readable medium described above, the determined voltage or clock speed may be greater than or lower than a voltage or clock speed used to process the control information received in the first TTI. In some examples of the method, apparatus, and non-transitory computer-readable medium described above, the voltage or clock speed used to process the control information received in the first TTI may be predefined. In some examples of the method, apparatus, and non-transitory computer-readable medium described above, the determined voltage or clock speed may be greater than or lower than a voltage or clock speed used to process reference signals received in the second TTI. In some examples of the method, apparatus, and non-transitory computer-readable medium described above, the voltage or clock speed used to process the reference signals received in the second TTI may be predefined.

In some examples of the method, apparatus, and non-transitory computer-readable medium described above, the first TTI and the second TTI include a same TTI, and determining the voltage or clock speed includes determining the voltage or clock speed for processing at least the portion of the data to transmit in the same TTI. Some examples of the method, apparatus, and non-transitory computer-readable medium described above may further include processes, features, means, or instructions for processing control information and reference signals received in the same TTI using a first voltage or clock speed, and processing at least the portion of the data to transmit in the same TTI using a second voltage or clock speed, the second voltage or clock speed being the determined voltage or clock speed.

Some examples of the method, apparatus, and non-transitory computer-readable medium described above may further include processes, features, means, or instructions for processing reference signals received in the second TTI using a voltage or clock speed different from the determined voltage or clock speed, performing channel estimation based at least in part on the processed reference signals, and processing at least the portion of the data to transmit in the second TTI using the determined voltage or clock speed based at least in part on the channel estimation. Some examples of the method, apparatus, and non-transitory computer-readable medium described above may further include processes, features, means, or instructions for performing channel state measurements based at least in part on the processed reference signals and processing uplink control information to transmit in the second TTI using the determined voltage or clock speed based at least in part on the channel state measurements, where the uplink control information includes channel state information (CSI) feedback. In some examples of the method, apparatus, and non-transitory computer-readable medium described above, the uplink control information further includes hybrid automatic repeat request (HARQ) feedback.

A method for wireless communication is described. The method may include receiving an indication to use multiple processing voltages or clock speeds in processing control information and data in a TTI, receiving control information in a TTI, identifying data to transmit in the TTI, processing, in accordance with the indication, at least a portion of the data to transmit in the TTI using a different voltage or clock speed from an initial voltage or clock speed used to process the received control information, and transmitting the processed data in the TTI.

An apparatus for wireless communication is described. The apparatus may include means for receiving an indication to use multiple processing voltages or clock speeds in processing control information and data in a TTI, means for receiving control information in a TTI, means for identifying data to transmit in the TTI, means for processing, in accordance with the indication, at least a portion of the data to transmit in the TTI using a different voltage or clock speed from an initial voltage or clock speed used to process the received control information, and means for transmitting the processed data in the TTI.

Another apparatus for wireless communication is described. The apparatus may include a processor, memory in electronic communication with the processor, and instructions stored in the memory. The instructions may be operable to cause the processor to receive an indication to use multiple processing voltages or clock speeds in processing control information and data in a TTI, receive control information in a TTI, identify data to transmit in the TTI, process, in accordance with the indication, at least a portion of the data to transmit in the TTI using a different voltage or clock speed from an initial voltage or clock speed used to process the received control information, and transmit the processed data in the TTI.

A non-transitory computer readable medium for wireless communication is described. The non-transitory computer-readable medium may include instructions operable to cause a processor to receive an indication to use multiple processing voltages or clock speeds in processing control information and data in a TTI, receive control information in a TTI, identify data to transmit in the TTI, process, in accordance with the indication, at least a portion of the data to transmit in the TTI using a different voltage or clock speed from an initial voltage or clock speed used to process the received control information, and transmit the processed data in the TTI.

In some examples of the method, apparatus, and non-transitory computer-readable medium described above, receiving the indication further includes receiving the indication to use multiple processing voltages or clock speeds in processing control information and data in the TTI when reference signals received in the TTI may be received in or after a certain symbol of the TTI. In some examples of the method, apparatus, and non-transitory computer-readable medium described above, receiving the indication further includes receiving the indication to use multiple processing voltages or clock speeds in processing control information and data in the TTI when a processing time scheduled for processing the data to transmit in the TTI may be below a threshold.

Some examples of the method, apparatus, and non-transitory computer-readable medium described above may further include processes, features, means, or instructions for processing control information and reference signals received in the TTI using the initial voltage or clock speed, and processing at least the portion of the data to transmit in the TTI using the different voltage or clock speed. Some examples of the method, apparatus, and non-transitory computer-readable medium described above may further include processes, features, means, or instructions for performing channel estimation based at least in part on the processed reference signals, and processing at least the portion of the data to transmit in the TTI using the different voltage or clock speed based at least in part on the channel estimation.

DETAILED DESCRIPTION

As the demand for wireless data increases, it becomes increasingly important to reduce latency in a wireless communications system. Accordingly, some wireless communications systems (e.g., fifth generation (5G) systems) may support techniques for reducing the latency associated with communications between a base station and a user equipment (UE). In one example, a UE may be configured to use a higher clock speed for processing data received within a transmission time interval (TTI) or to be transmitted in a TTI. In conventional wireless systems (e.g., a Long Term Evolution (LTE) system), in order to configure the UE to use a higher clock speed for processing data within a TTI, a base station may configure the UE to use a higher clock speed to process all signals within the TTI. However, the use of a higher clock speed for processing certain signals within the TTI may be unnecessary and may increase the power consumption at the UE.

As described herein, a UE may support efficient techniques for utilizing an increased clock speed for processing certain signals within a TTI. Specifically, rather than using the same clock speed for processing all signals within a TTI, the UE may be configured to use multiple different clock speeds for processing different signals within a TTI. As such, the UE may be able to increase its clock speed to process certain signals within a TTI (e.g., data signals), and the UE may use a reduced clock speed to process other signals within the TTI (e.g., control or reference signals). That is, the UE may increase power consumption to process certain signals (e.g., data signals) within a TTI. In some cases, the UE may determine when to use an increased clock speed for processing certain signals (e.g., data signals) within a TTI based on control information received from a base station (e.g., within the TTI or within a previous TTI).

Aspects of the disclosure introduced above are described below in the context of a wireless communications system. Examples of processes and signaling exchanges that support dynamic clock switching within a TTI are then described. Aspects of the disclosure are further illustrated by and described with reference to apparatus diagrams, system diagrams, and flowcharts that relate to dynamic clock switching within a TTI.

Figure 1:
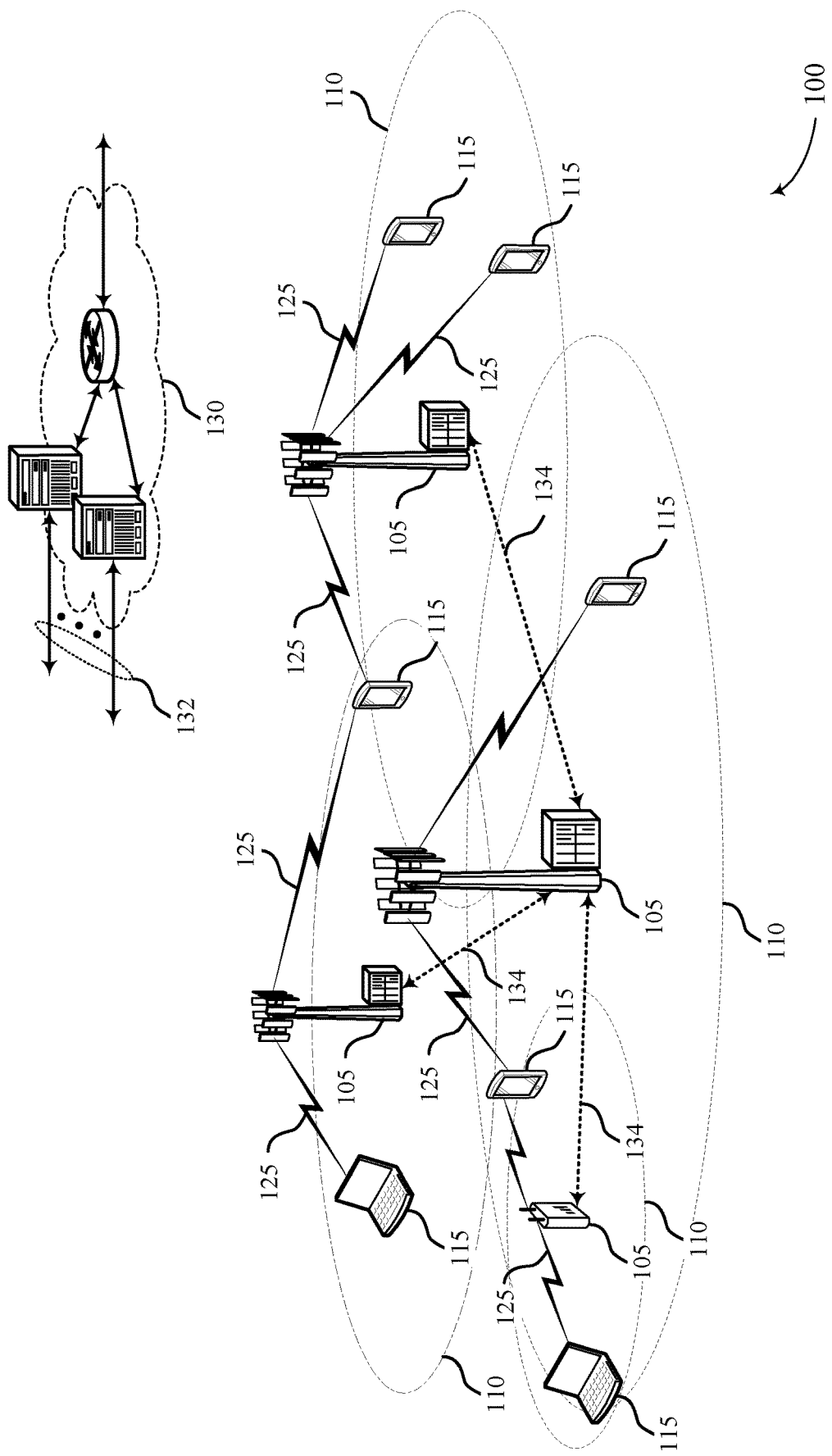
FIGS. 1 and 2 illustrate examples of wireless communications systems that support dynamic clock switching within a transmission time interval (TTI) in accordance with aspects of the present disclosure.

FIG. 1 illustrates an example of a wireless communications system 100 that supports dynamic clock switching within a TTI in accordance with aspects of the present disclosure. The wireless communications system 100 includes base stations 105, UEs 115, and a core network 130. In some examples, the wireless communications system 100 may be an LTE network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods.

In some cases, a subframe may be the smallest scheduling unit of the wireless communications system 100 and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In wireless communications system 100, a base station 105 may communicate with a UE 115 using self-contained TTIs. A self-contained TTI may include downlink transmissions from a base station 105 to a UE 115 and uplink transmissions from a UE 115 to a base station 105. For instance, a self-contained TTI may include downlink control information, uplink or downlink data (e.g., scheduled by the downlink control information), and uplink control information. In some cases, a UE 115 may be scheduled to process data received in a TTI or data to be transmitted in a TTI within a limited amount of time. For example, UE 115 may be scheduled to provide HARQ feedback to a base station 105 in a certain symbol period of a TTI (e.g., a last symbol period of a TTI), and the UE 115 may have to finish processing data received in the TTI before this symbol period. Additionally, in some cases, the UE 115 may be configured to perform channel estimation using reference signals received in a TTI prior to processing data within the TTI. In such cases, if the reference signals are received late in the TTI (e.g., delayed), the UE 115 may have a limited amount of time to finish processing data within the TTI after performing channel estimation using the reference signals.

Accordingly, in some wireless systems, to ensure that a UE 115 is able to process the data in a TTI in a specific time duration (e.g., a limited amount of time), the UE 115 may be configured to use a high clock speed throughout the TTI for processing all signals within a TTI. The high clock speed (or clock rate) may be associated with the use of a high voltage at the UE 115, a high processing speed (or processing rate), and more power consumption. Similarly, for cross-TTI scheduling where the UE 115 receives control information in a first TTI and data in a second TTI, the UE 115 may be configured to use a high clock speed in both TTIs for processing the control information and the data. However, the use of a high clock speed for processing all signals within a TTI or across TTIs may be wasteful since it may not be necessary for the UE 115 to process certain signals using the high clock speed. For example, it may not be necessary for the UE 115 to process control signals in the first few symbols of a self-contained TTI using the high clock speed. Similarly, it may not be necessary for the UE 115 to process control signals received in a first TTI using the high clock speed. Wireless communications system 100 may support efficient techniques for configuring UE 115 to support faster data processing while limiting power consumption at the UE 115. Specifically, UE 115 may be configured to use multiple clock speeds for processing different signals within a TTI or across TTIs, and UE 115 may determine when to use an increased clock speed for processing certain signals (e.g., data signals) within a TTI or across multiple TTIs based on control information received from a base station 105.

Figure 2:
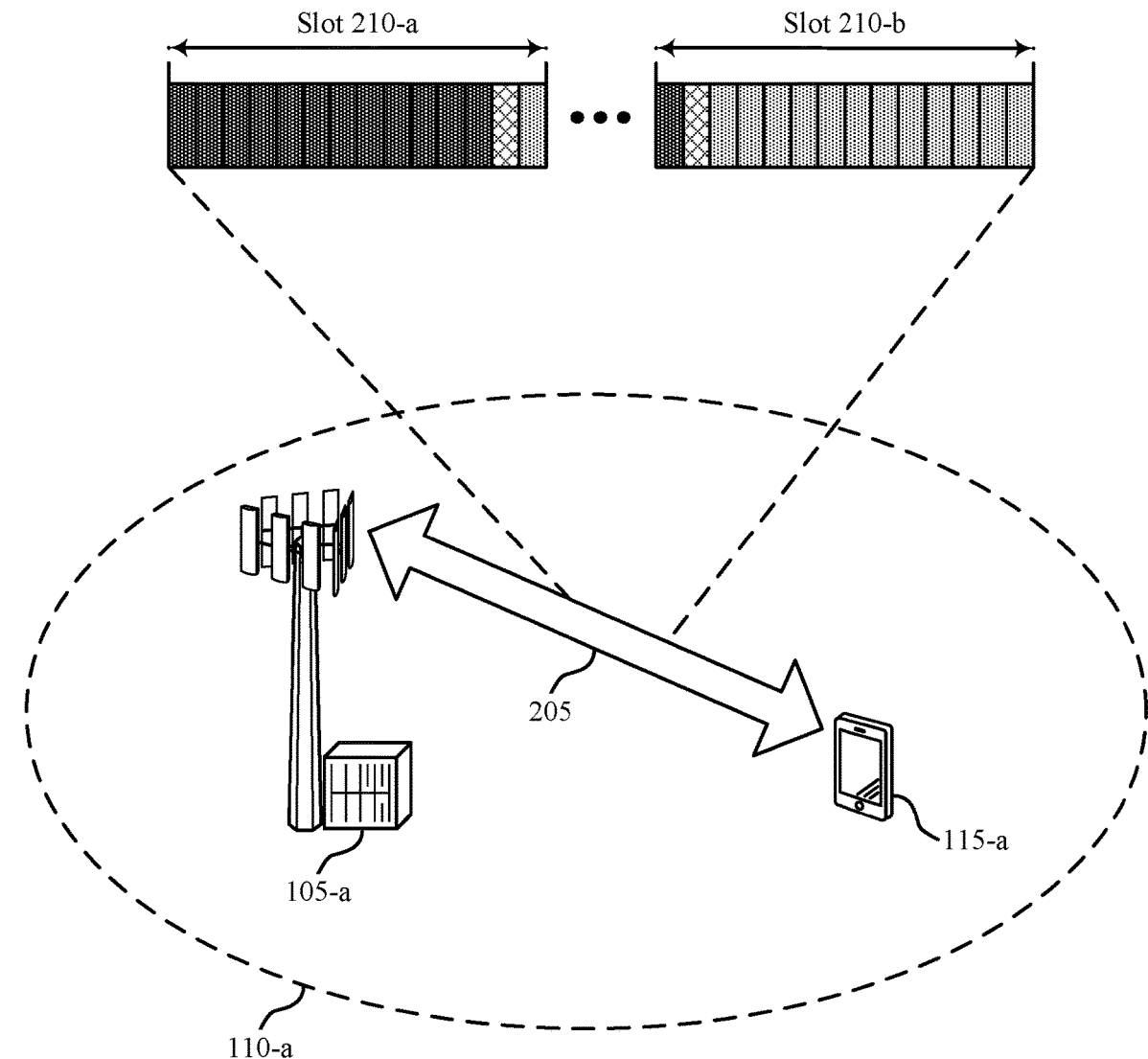
Figure 2:
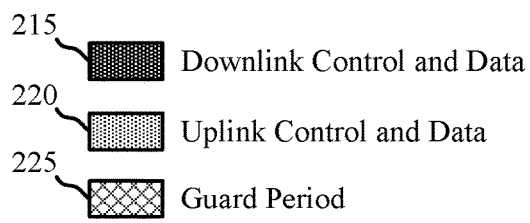

FIG. 2 illustrates an example of a wireless communications system 200 that supports dynamic clock switching within a TTI in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for UEs 115 (including UE 115-a) within coverage area 110-a, and base station 105-a may communicate with UE 115-a on resources of a carrier 205. In some cases, base station 105-a and UE 115-a may communicate during slots 210 (e.g., self-contained slots). Slots 210 may include symbol periods allocated for downlink control and data 215, uplink control and data 220, and guard periods 225. Slot 210-a may be an example of a downlink centric slot, and slot 210-b may be an example of an uplink centric slot. Wireless communications system 200 may implement aspects of wireless communications system 100. For example, wireless communications system 200 may support techniques for configuring UE 115-a to use multiple clock speeds for processing different signals within a TTI (e.g., a slot 210) or across multiple TTIs (e.g., slots 210), as further explained below and in connection with FIG. 3.

Figure 3:
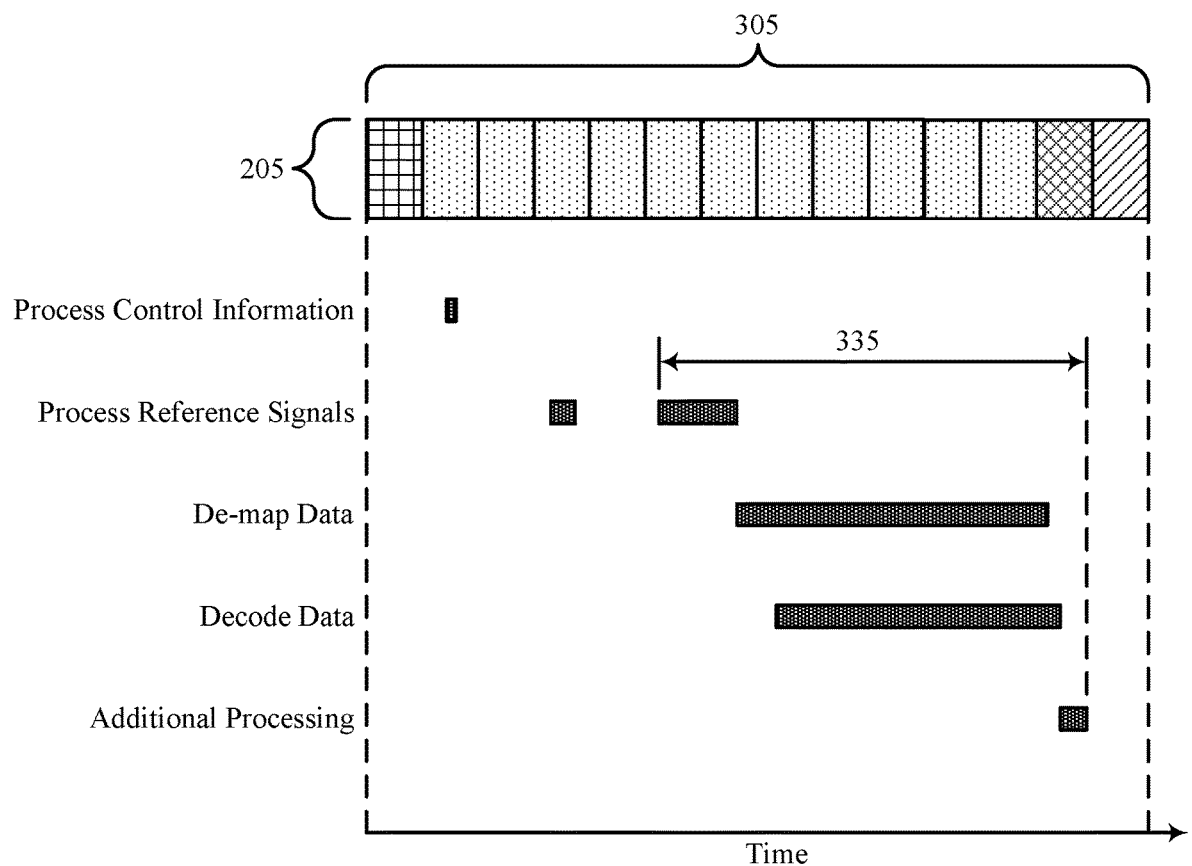
FIG. 3 illustrates an example diagram showing downlink signal processing within a TTI received on a carrier in accordance with aspects of the present disclosure.

FIG. 3 illustrates an example diagram 300 showing downlink signal processing within a TTI 305 (e.g., a self-contained TTI) received on a carrier 205 in accordance with aspects of the present disclosure. In this example, UE 115-a may receive downlink control information 310 and downlink data 315 within TTI 305, and UE 115-a may be scheduled to provide HARQ feedback (i.e., uplink control information 325) in a last symbol of TTI 305 (i.e., after transitioning from a downlink configuration to an uplink configuration using guard period 320). Using the techniques described herein, UE 115-a may process the downlink control information 310 using an initial clock speed, and UE 115-a may determine a clock speed for processing other signals within TTI 305 based on the downlink control information 310 received in TTI 305 or other downlink control information received in a previous TTI.

As an example, UE 115-a may determine a response time for providing HARQ feedback on data received in TTI 305 based on downlink control information received from base station 105-a, and UE 115-a may determine a clock speed for processing data within TTI 305 based on the response time. In the example of FIG. 3, UE 115-a may determine that it is scheduled to provide HARQ feedback in a last symbol of TTI 305, and UE 115-*a* may determine a clock speed for processing data within TTI 305 such that UE 115-*a* may be able to finish processing data before the last symbol of TTI 305. Once UE 115-*a* finishes processing (e.g., de-mapping, decoding, etc.) the data in TTI 305, UE 115-*a* may provide HARQ feedback on the processed data in the last symbol of TTI 305.

Additionally, or alternatively, UE 115-*a* may determine a location of reference signals (e.g., demodulation reference signals (DMRSs)) within TTI 305 based on downlink control information received from base station 105-*a*, and UE 115-*a* may determine a clock speed for processing data (and a portion of the reference signals) within TTI 305 based on the location of the reference signals within TTI 305. As illustrated, UE 115-*a* may identify two sets of reference signals to be received in different symbols of TTI 305, and UE 115-*a* may determine that the second set of reference signals is to be received late in the TTI 305. Accordingly, UE 115-*a* may delay data processing within TTI 305 to allow time for the UE 115-*a* to perform channel estimation using both sets of reference signals in the TTI 305. Since data processing in TTI 305 may be delayed, UE 115-*a* may increase a clock speed for processing the data (and some reference signals) during time period 335 of TTI 305 such that UE 115-*a* may be able to finish processing the data within TTI 305 (or before the last symbol of TTI 305).

Although the examples described above with reference to FIG. 3 relate to the use of multiple clock speeds for processing downlink signals received within a TTI, it is to be understood that the techniques described herein for using multiple clock speeds for signal processing within a TTI also apply to uplink communications between UE 115-*a* and base station 105-*a*. As an example, UE 115-*a* may receive control information from base station 105-*a* that indicates a processing time for processing data (and, in some cases, for processing control information, such as channel state information (CSI) feedback, HARQ feedback, etc.) to be transmitted within a TTI. As such, UE 115-*a* may adjust (e.g., increase) a clock speed used for processing the data (and/or the control information) for an uplink transmission (e.g., symbol mapping, encoding, etc.) such that the UE 115-*a* may finish processing the data within the TTI in the time allocated for processing. Further, although the examples described above with reference to FIG. 3 relate to the use of multiple clock speeds for processing signals within a TTI, it is to be understood that the techniques described herein for using multiple clock speeds for signal processing may be implemented across TTIs. For instance, UE 115-*a* may receive control information from base station 105-*a* in a first TTI scheduling a data transmission in a second TTI, and the UE 115-*a* may adjust (e.g., increase) a clock speed to be used for processing the data in the second TTI. In particular, the UE 115-*a* may use an increased clock speed for processing the data in the second TTI (e.g., based on a processing time for processing the data in the second TTI).

Figure 4:
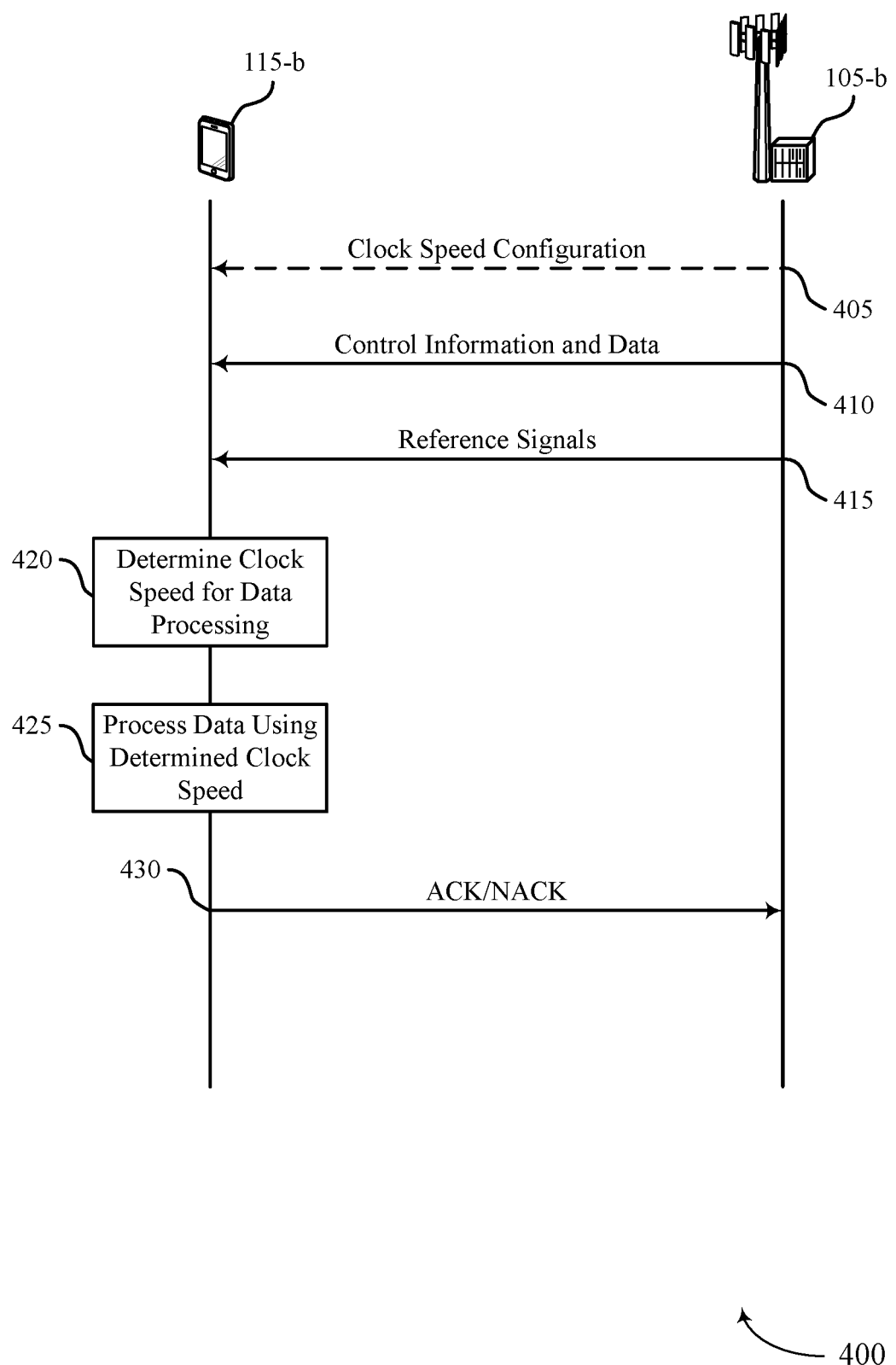
FIGS. 4 and 5 illustrate examples of process flows in systems that support dynamic clock switching within a TTI in accordance with aspects of the present disclosure.

FIG. 4 illustrates an example of a process flow 400 in a system that supports dynamic clock switching within a TTI in accordance with aspects of the present disclosure. Process flow 400 illustrates aspects of techniques performed by base station 105-*b*, which may be an example of a base station 105 described with reference to FIGS. 1-3. Process flow 400 also illustrates aspects of techniques performed by a UE 115-*b*, which may be an example of a UE 115 described with reference to FIGS. 1-3. Process flow 400 generally relates to an example of dynamic clock switching within a TTI at a UE during processing of downlink data.

At 405, base station 105-*b* may transmit a clock speed configuration to UE 115-*b* to configure UE 115-*b* to use multiple processing clock speeds in processing control information and data in a TTI. In some cases, base station 105-*b* may transmit an indication that the UE 115-*b* is to use the multiple processing clock speeds in processing control information and data in a TTI when a response time for providing HARQ feedback on the data received in the TTI is below a threshold, when reference signals received in the TTI are received in or after a certain symbol of the TTI, and/or when a processing time scheduled for processing the data in the TTI is below a threshold. In other instances, UE 115-*b* may independently determine that multiple processing clock speeds may be used in processing control information and data in a TTI.

At 410, base station 105-*b* may transmit control information and data to UE 115-*b* within a TTI. In some cases, at 415, base station 105-*b* may also transmit reference signals to UE 115-*b* in the TTI. UE 115-*b* may process, in accordance with the clock speed configuration, the control information received in the TTI at an initial clock speed, and, at 420, UE 115-*b* may determine a clock speed for processing at least a portion of the data received in the TTI based on the control information received in the TTI or other control information received in a previous TTI.

In one example, UE 115-*b* may determine a location of reference signals in the TTI based on control information received from base station 105-*b*, and UE 115-*b* may determine the clock speed for processing at least the portion of the data received in the TTI based on the location of the reference signals in the TTI. In another example, UE 115-*b* may determine a response time for providing HARQ feedback on the data received in the TTI based on the control information, and UE 115-*b* may determine the clock speed for processing at least the portion of the data received in the TTI based on the response time.

In some cases, the determined clock speed used to process at least the portion of the data in the TTI is different from a clock speed used to process the control information received in the TTI. For example, the determined clock speed may be greater than or lower than the clock speed used to process the control information received in the TTI, and the clock speed used to process the control information received in the TTI (i.e., the initial clock speed) may be predefined. Further, the determined clock speed may be greater than or lower than the clock speed used to process reference signals received in the TTI, and the clock speed used to process reference signals received in the TTI may be predefined.

At 425, UE 115-*b* may process the data in the TTI using the determined clock speed. In some cases, UE 115-*b* may process the control information and reference signals received in the TTI in a first portion of the TTI using a first clock speed, and UE 115-*b* may process at least the portion of the data received in the TTI in a second portion of the TTI using a second clock speed (i.e., the determined clock speed). In addition, UE 115-*b* may perform channel estimation based on the processed reference signals, and UE 115-*b* may process at least the portion of the data received in the TTI using the determined clock speed based on the channel estimation. At 430, UE 115-*b* may then transmit ACK/NACK feedback on the processed data to base station 105-*b*.

Figure 5:
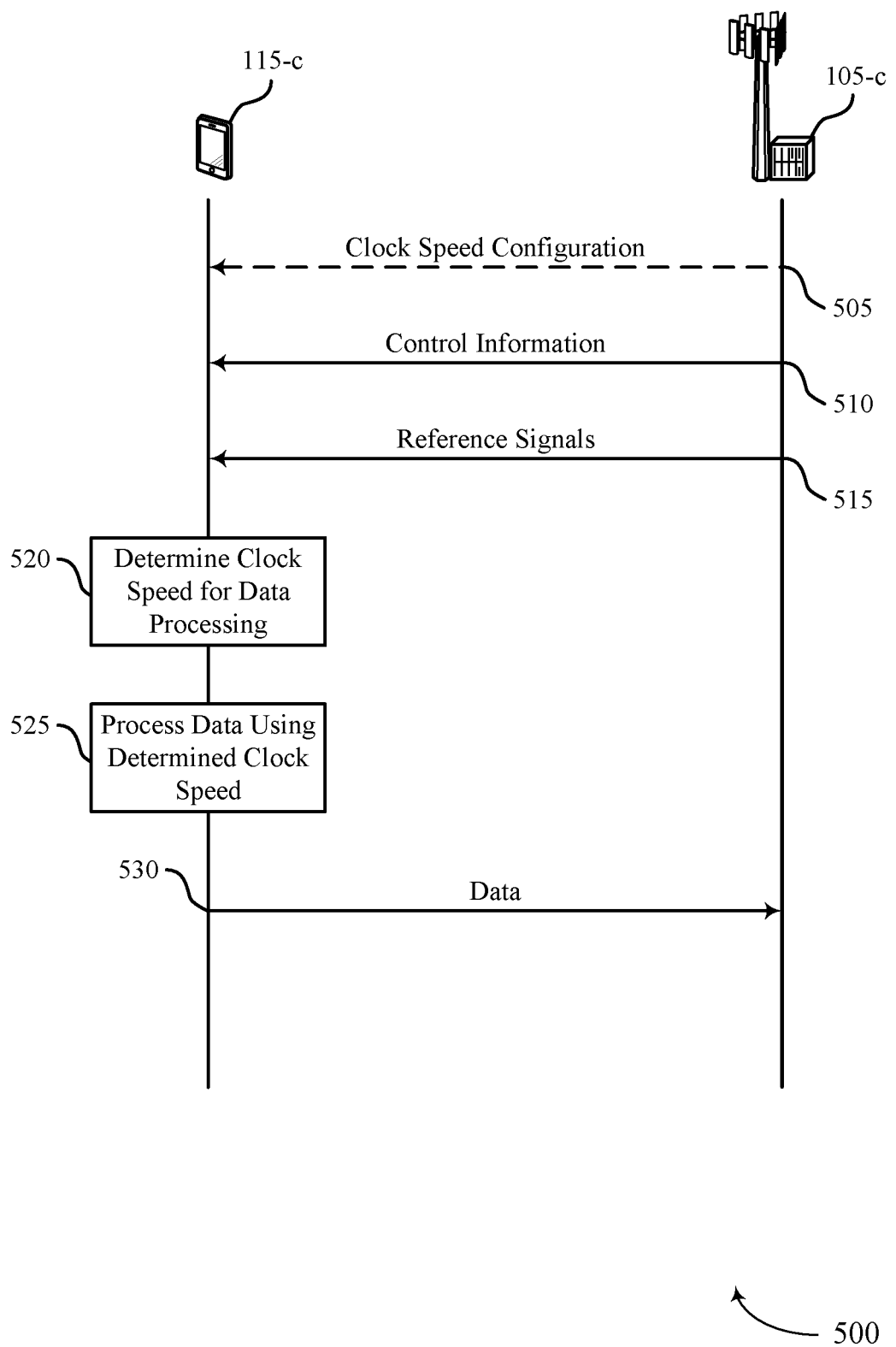

FIG. 5 illustrates an example of a process flow 500 in a system that supports dynamic clock switching within a TTI in accordance with aspects of the present disclosure. Process flow 500 illustrates aspects of techniques performed by base station 105-*c*, which may be an example of a base station 105 described with reference to FIGS. 1-3. Process flow 500 also illustrates aspects of techniques performed by a UE 115-*c*, which may be an example of a UE 115 described with reference to FIGS. 1-3. Process flow 500 generally relates to an example of dynamic clock switching within a TTI at a UE during encoding or processing of uplink data.

At 505, base station 105-*c* may transmit a clock speed configuration to UE 115-*c* to configure UE 115-*c* to use multiple processing clock speeds in processing control information and data in a TTI. In some cases, base station 105-*c* may transmit an indication that the UE 115-*c* is to use the multiple processing clock speeds in processing control information and data in a TTI when a response time for providing HARQ feedback on the data received in the TTI is below a threshold, when reference signals received in the TTI are received in or after a certain symbol of the TTI, and/or when a processing time scheduled for processing the data in the TTI is below a threshold. In other instances, UE 115-*c* may independently determine that multiple processing clock speeds may be used in processing control information and data in a TTI.

At 510, base station 105-*c* may transmit control information to UE 115-*c* within a TTI. In some cases, at 515, base station 105-*c* may also transmit reference signals to UE 115-*c* in the TTI. UE 115-*c* may process, in accordance with the clock speed configuration, the control information received in the TTI at an initial clock speed, and, at 520, UE 115-*c* may determine a clock speed for processing at least a portion of data to transmit in the TTI based on the control information received in the TTI or other control information received in a previous TTI.

In one example, UE 115-*c* may determine a processing time for processing data to transmit in the TTI based on the control information, and UE 115-*c* may determine the clock speed for processing at least the portion of the data to transmit in the TTI based on the processing time. In another example, UE 115-*c* may determine a location of reference signals in the TTI based on control information received from base station 105-*c*, and UE 115-*c* may determine the clock speed for processing at least the portion of the data received in the TTI based on the location of the reference signals in the TTI.

In some cases, the determined clock speed used to process at least the portion of the data in the TTI is different from a clock speed used to process the control information received in the TTI. For example, the determined clock speed may be greater than or lower than the clock speed used to process the control information received in the TTI, and the clock speed used to process the control information received in the TTI (i.e., the initial clock speed) may be predefined. Further, the determined clock speed may be greater than or lower than the clock speed used to process reference signals received in the TTI, and the clock speed used to process reference signals received in the TTI may be predefined.

At 525, UE 115-*c* may process the data in the TTI using the determined clock speed. In some cases, the UE 115-*c* may process the control information and reference signals received in the TTI in a first portion of the TTI using a first clock speed, and UE 115-*c* may process at least the portion of the data to transmit in the TTI in a second portion of the TTI using a second clock speed (i.e., the determined clock speed). In addition, UE 115-*c* may perform channel estimation based on the processed reference signals, and UE 115-*c* may process at least the portion of the data to transmit in the TTI using the determined clock speed based on the channel estimation. At 530, UE 115-*c* may then transmit the processed data to base station 105-*c*.

Although the examples described above provide techniques at a UE 115 for using multiple clock speeds for processing uplink or downlink transmissions in a TTI or across TTIs, it is to be understood that the same techniques may be implemented at a base station 105. In particular, a base station 105 may support techniques for adjusting a clock speed for processing uplink or downlink transmissions in a TTI or across TTIs. As an example, a base station 105 may identify resources on which to receive an uplink transmission from a UE, and the base station 105 may adjust (e.g., increase) a clock speed prior to receiving the uplink transmission (e.g., in anticipation of the uplink transmission).

Figure 6:
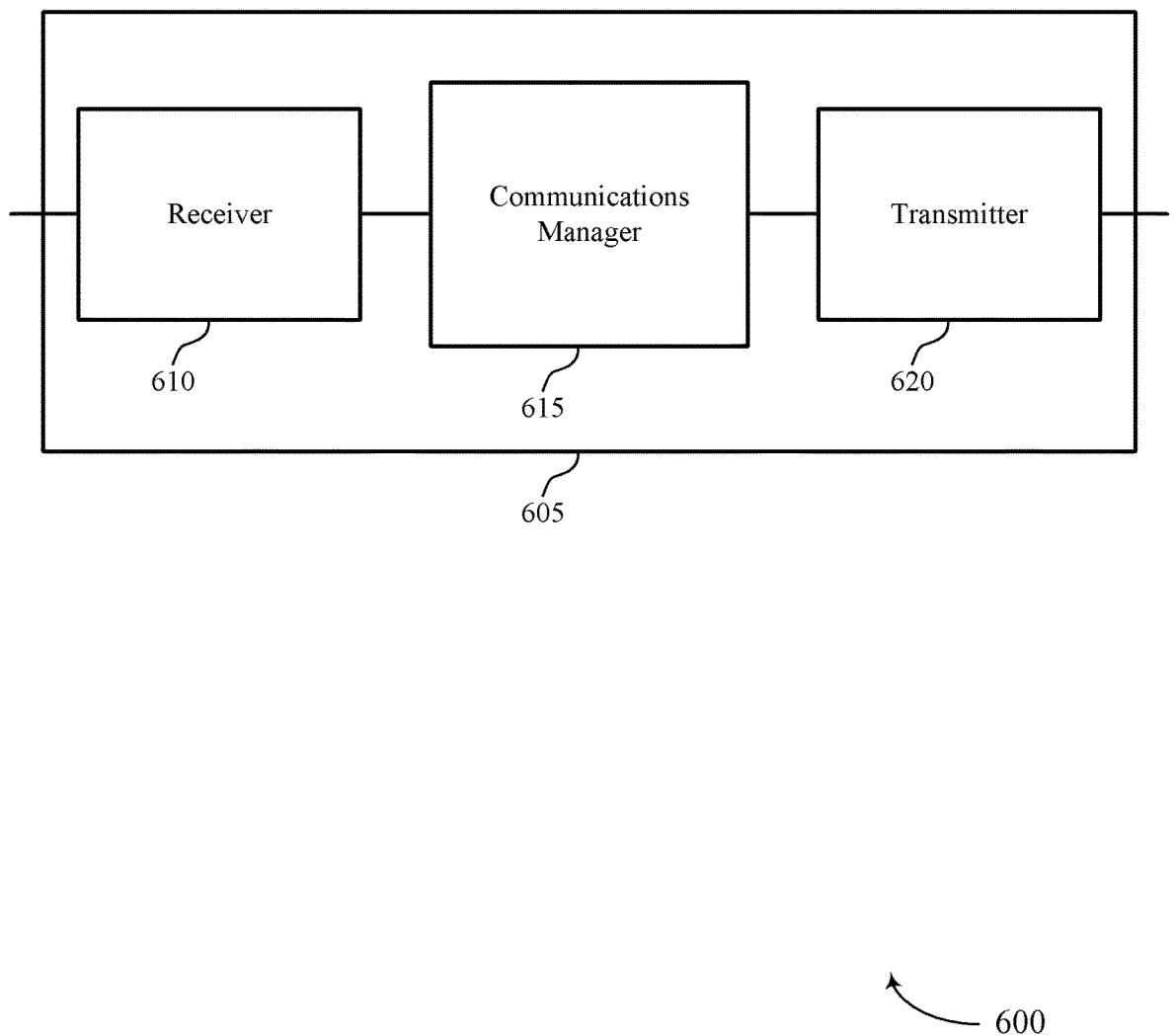
FIGS. 6-8 show block diagrams of a device or devices that support dynamic clock switching within a TTI in accordance with aspects of the present disclosure.

FIG. 6 shows a block diagram 600 of a wireless device 605 that supports dynamic clock switching within a TTI in accordance with aspects of the present disclosure. Wireless device 605 may be an example of aspects of a UE 115 as described herein. In some cases, the wireless device 605 may be an example of aspects of a base station 105. Wireless device 605 may include receiver 610, communications manager 615, and transmitter 620. Wireless device 605 may also include a processor. The processor may be a component of the communications manager 615 and/or a separate component of wireless device 605. Each of these components may be in communication with one another (e.g., via one or more buses).

Receiver 610 may receive information such as packets, user data, or control information associated with various information channels (e.g., control channels, data channels, and information related to dynamic clock switching within a TTI, etc.). Information may be passed on to other components of the device. The receiver 610 may be an example of aspects of the transceiver 935 described with reference to FIG. 9. The receiver 610 may utilize a single antenna or a set of antennas.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Communications manager 615 may be an example of aspects of the communications manager 915 described with reference to FIG. 9. Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In an example, receiver 610 may receive control information in a first TTI and receive data in a second TTI. Communications manager 615 may determine a voltage or clock speed for processing at least a portion of the data received in the second TTI based on the control information received in the first TTI, the voltage or clock speed being associated with a change in power consumption at the wireless device 605 in the second TTI compared to the first TTI, and communications manager 615 may process at least the portion of the data received in the second TTI using the determined voltage or clock speed. In some cases, the first TTI and the second TTI include a same TTI and determining the voltage or clock speed includes determining the voltage or clock speed for processing at least the portion of the data received in the same TTI. The communications manager 615 may also receive an indication to use multiple processing voltages or clock speeds in processing control information and data in a TTI. Receiver 610 may then receive control information and data in a TTI, and communications manager 615 may process, in accordance with the indication, at least a portion of the data received in the TTI using a different voltage or clock speed from an initial voltage or clock speed used to process the control information.

In another example, receiver 610 may also receive control information in a first TTI. The communications manager 615 may then identify data to transmit in a second TTI and determine a voltage or clock speed for processing at least a portion of the data to transmit in the second TTI based on the control information received in the first TTI, the voltage or clock speed being associated with a change in power consumption at the wireless device 605 in the second TTI compared to the first TTI. Communications manager 615 may process at least the portion of the data to transmit in the second TTI using the determined voltage or clock speed. Transmitter 620 may then transmit the processed data in the second TTI. Receiver 610 may also receive control information in a TTI. The communications manager 615 may receive an indication to use multiple processing voltages or clock speeds in processing control information and data in a TTI, identify data to transmit in the TTI, and process, in accordance with the indication, at least a portion of the data to transmit in the TTI using a different voltage or clock speed from an initial voltage or clock speed used to process the received control information. Transmitter 620 may then transmit the processed data in the TTI.

Figure 7:
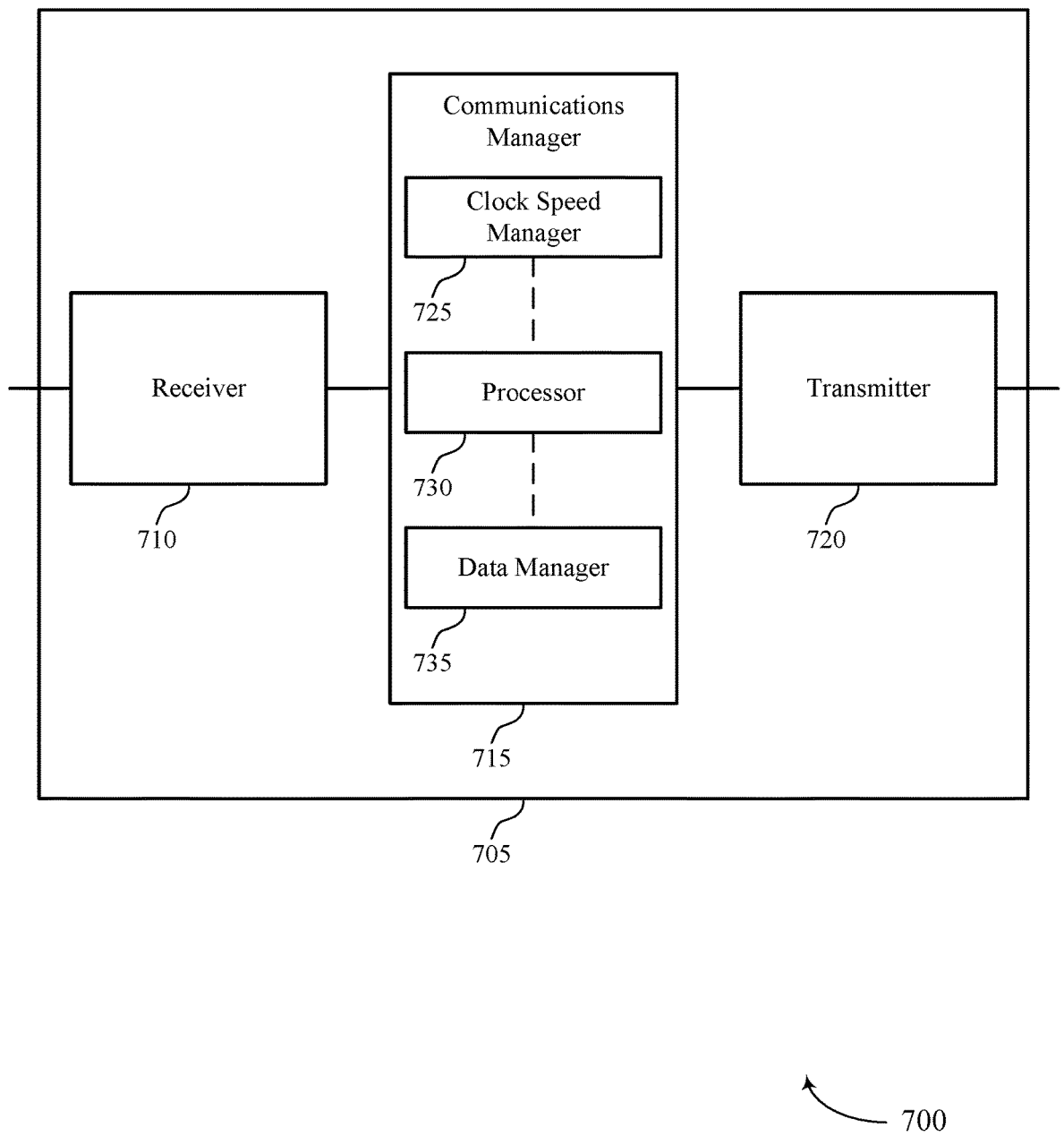

FIG. 7 shows a block diagram 700 of a wireless device 705 that supports dynamic clock switching within a TTI in accordance with aspects of the present disclosure. Wireless device 705 may be an example of aspects of a wireless device 605 or a UE 115 as described with reference to FIG. 6. In some cases, the wireless device 705 may be an example of aspects of a base station 105. Wireless device 705 may include receiver 710, communications manager 715, and transmitter 720. Wireless device 705 may also include a processor. The processor may be a component of the communications manager 715 and/or a separate component of wireless device 705. Each of these components may be in communication with one another (e.g., via one or more buses).

Receiver 710 may receive information such as packets, user data, or control information associated with various information channels (e.g., control channels, data channels, and information related to dynamic clock switching within a TTI, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may include clock speed manager 725, processor 730, and data manager 735.

Clock speed manager 725 may determine a voltage or clock speed for processing at least a portion of data received in a second TTI based on control information received in a first TTI, the voltage or clock speed being associated with a change in power consumption at the wireless device 705 in the second TTI compared to the first TTI. In some cases, clock speed manager 725 may determine the voltage or clock speed for processing at least the portion of the data received in the second TTI based on a location of reference signals in the second TTI. In some cases, clock speed manager 725 may determine the voltage or clock speed for processing at least the portion of the data received in the second TTI based on a response time for providing HARQ feedback on the data received in the second TTI. In some cases, the determined voltage or clock speed is different from a voltage or clock speed used to process the control information. In some cases, the determined voltage or clock speed is greater than or lower than a voltage or clock speed used to process the control information received in the first TTI. In some cases, the voltage or clock speed used to process the control information received in the first TTI is predefined. In some cases, the determined voltage or clock speed is greater than or lower than a voltage or clock speed used to process reference signals received in the second TTI. In some cases, the voltage or clock speed used to process the reference signals received in the second TTI is predefined.

Processor 730 may process at least the portion of the data received in the second TTI using the determined voltage or clock speed. In some cases, the first TTI and the second TTI include a same TTI and determining the voltage or clock speed includes determining the voltage or clock speed for processing at least the portion of the data received in the same TTI. In such cases, processor 730 may process control information and reference signals received in the same TTI using a first voltage or clock speed, and processor 730 may process at least the portion of the data received in the same TTI using a second voltage or clock speed, the second voltage or clock speed being the determined voltage or clock speed. In some cases, processor 730 may process reference signals received in the second TTI using a voltage or clock speed different from the determined voltage or clock speed, and processor 730 may process at least the portion of the data received in the second TTI using the determined voltage or clock speed based on a channel estimation (e.g., determined using the processed reference signals).

In an example, data manager 735 may identify data to transmit in a second TTI. Clock speed manager 725 may then determine a voltage or clock speed for processing at least a portion of data to transmit in the second TTI based on control information received in a first TTI, the voltage or clock speed being associated with additional power consumption at the wireless device 705 in the second TTI compared to the first TTI. In some cases, clock speed manager 725 may determine that the control information indicates a processing time for processing data to transmit in the second TTI, and clock speed manager 725 may determine the voltage or clock speed for processing at least the portion of the data to transmit in the second TTI based on the indicated processing time. In some cases, clock speed manager 725 may determine the voltage or clock speed for processing at least the portion of the data to transmit in the second TTI based on the location of reference signals in the second TTI. In some cases, the determined voltage or clock speed is different from a voltage or clock speed used to process the control information. In some cases, the determined voltage or clock speed is greater than or lower than a voltage or clock speed used to process the control information received in the first TTI. In some cases, the voltage or clock speed used to process the control information received in the first TTI is predefined. In some cases, the determined voltage or clock speed is greater than or lower than a voltage or clock speed used to process reference signals received in the second TTI. In some cases, the voltage or clock speed used to process the reference signals received in the second TTI is predefined.

Processor 730 may also process at least the portion of the data to transmit in the second TTI using the determined voltage or clock speed. In some cases, the first TTI and the second TTI include a same TTI and determining the voltage or clock speed includes determining the voltage or clock speed for processing at least the portion of the data to transmit in the same TTI. In such cases, processor 730 may process control information and reference signals received in the same TTI using a first voltage or clock speed, and processor 730 may process at least the portion of the data to transmit in the same TTI using a second voltage or clock speed, the second voltage or clock speed being the determined voltage or clock speed. In some cases, processor 730 may process reference signals received in the second TTI using a voltage or clock speed different from the determined voltage or clock speed, and processor 730 may process at least the portion of the data to transmit in the second TTI using the determined voltage or clock speed based on a channel estimation (e.g., determined using the processed reference signals). In some cases, processor 730 may process uplink control information to transmit in the second TTI using the determined voltage or clock speed based on channel state measurements, where the uplink control information includes CSI feedback.

Clock speed manager 725 may also receive an indication that the wireless device 705 is to use multiple processing voltages or clock speeds in processing control information and data in a TTI. In some cases, clock speed manager 725 may receive the indication that the wireless device 705 is to use multiple processing voltages or clock speeds in processing control information and data in the TTI when a response time for providing HARQ feedback on the data received in the TTI is below a threshold. In some cases, clock speed manager 725 may receive the indication that the wireless device 705 is to use multiple processing voltages or clock speeds in processing control information and data in the TTI when reference signals received in the TTI are received in or after a certain symbol of the TTI. In some cases, clock speed manager 725 may receive the indication that the wireless device 705 is to use multiple processing voltages or clock speeds in processing control information and data in the TTI when a processing time scheduled for processing the data in the TTI is below a threshold.

Processor 730 may then process, in accordance with the indication, at least a portion of the data received in the TTI using a different voltage or clock speed from an initial voltage or clock speed used to process the control information. In some cases, processor 730 may process control information and reference signals received in the TTI using the initial voltage or clock speed and process at least the portion of the data received in the TTI using the different voltage or clock speed. In some cases, processor 730 may process at least the portion of the data received in the TTI using the different voltage or clock speed based on a channel estimation (e.g., determined using the processed reference signals).

In some cases, data manager 735 may identify data to transmit in the TTI. Processor 730 may then process, in accordance with the indication, at least a portion of the data to transmit in the TTI using a different voltage or clock speed from an initial voltage or clock speed used to process the control information. In some cases, processor 730 may process control information and reference signals received in the TTI using the initial voltage or clock speed, and processor 730 may process at least the portion of the data to transmit in the TTI using the different voltage or clock speed. In some cases, processor 730 may process at least the portion of the data to transmit in the TTI using a different voltage or clock speed based on a channel estimation (e.g., determined using the processed reference signals).

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
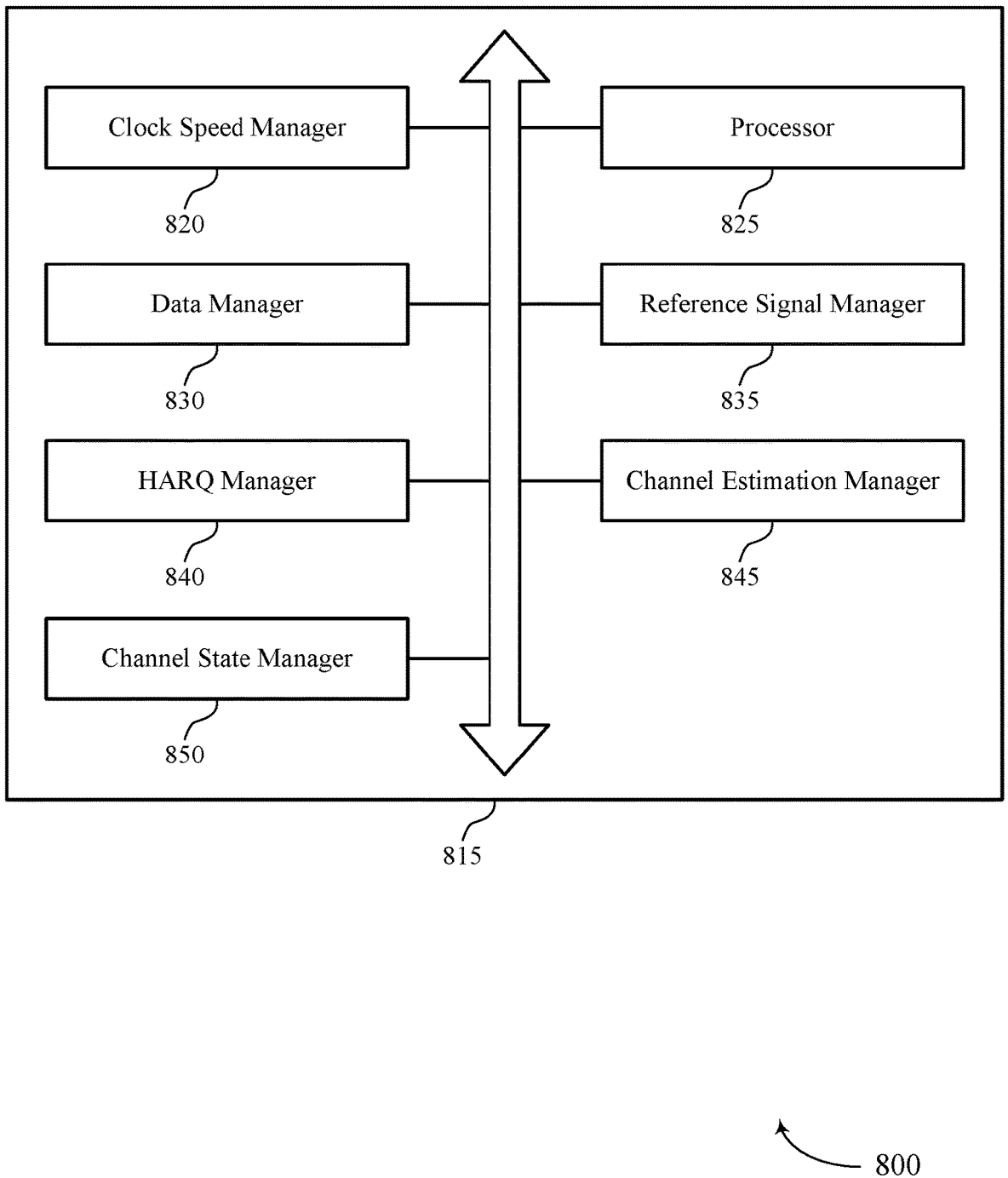

FIG. 8 shows a block diagram 800 of a communications manager 815 that supports dynamic clock switching within a TTI in accordance with aspects of the present disclosure. The communications manager 815 may be an example of aspects of a communications manager 615, a communications manager 715, or a communications manager 915 described with reference to FIGS. 6, 7, and 9. The communications manager 815 may include clock speed manager 820, processor 825, data manager 830, reference signal manager 835, HARQ manager 840, channel estimation manager 845, channel state manager 850. Each of these modules may communicate, directly or indirectly, with one another (e.g., via one or more buses).

Clock speed manager 820 may determine a voltage or clock speed for processing at least a portion of data received in a second TTI based on control information received in a first TTI, the voltage or clock speed being associated with a change in power consumption at the communications manager 815 in the second TTI compared to the first TTI. In some cases, reference signal manager 835 may determine that the control information indicates a location of reference signals in the second TTI, and clock speed manager 820 may determine the voltage or clock speed for processing at least the portion of the data received in the second TTI based on the location of reference signals in the second TTI. In some cases, HARQ manager 840 may determine that the control information indicates a response time for providing HARQ feedback on the data received in the second TTI, and clock speed manager 820 may determine the voltage or clock speed for processing at least the portion of the data received in the second TTI based on the response time. In some cases, the determined voltage or clock speed is different from a voltage or clock speed used to process the control information. In some cases, the determined voltage or clock speed is greater than or lower than a voltage or clock speed used to process the control information received in the first TTI. In some cases, the voltage or clock speed used to process the control information received in the first TTI is predefined. In some cases, the determined voltage or clock speed is greater than or lower than a voltage or clock speed used to process reference signals received in the second TTI. In some cases, the voltage or clock speed used to process the reference signals received in the second TTI is predefined.

Processor 825 may process at least the portion of the data received in the second TTI using the determined voltage or clock speed. In some cases, the first TTI and the second TTI include a same TTI and determining the voltage or clock speed includes determining the voltage or clock speed for processing at least the portion of the data received in the same TTI. In such cases, processor 825 may process control information and reference signals received in the same TTI using a first voltage or clock speed, and processor 825 may process at least the portion of the data received in the same TTI using a second voltage or clock speed, the second voltage or clock speed being the determined voltage or clock speed. In some cases, processor 825 may process reference signals received in the second TTI using a voltage or clock speed different from the determined voltage or clock speed, channel estimation manager 845 may perform channel estimation based on the processed reference signals, and processor 825 may process at least the portion of the data received in the second TTI using the determined voltage or clock speed based on the channel estimation.

Data manager 830 may identify data to transmit in a second TTI. Clock speed manager 820 may then determine a voltage or clock speed for processing at least a portion of data to transmit in the second TTI based on control information received in a first TTI, the voltage or clock speed being associated with a change in power consumption at the communications manager 815 in the second TTI compared to the first TTI. In some cases, clock speed manager 820 may determine that the control information indicates a processing time for processing data to transmit in the second TTI, and clock speed manager 820 may determine the voltage or clock speed for processing at least the portion of the data to transmit in the second TTI based on the indicated processing time. In some cases, reference signal manager 835 may determine that the control information indicates a location of reference signals in the second TTI, and clock speed manager 820 may determine the voltage or clock speed for processing at least the portion of the data to transmit in the second TTI based on the location of reference signals in the second TTI. In some cases, the determined voltage or clock speed is different from a voltage or clock speed used to process the control information. In some cases, the determined voltage or clock speed is greater than or lower than a voltage or clock speed used to process the control information received in the first TTI. In some cases, the voltage or clock speed used to process the control information received in the first TTI is predefined. In some cases, the determined voltage or clock speed is greater than or lower than a voltage or clock speed used to process reference signals received in the second TTI. In some cases, the voltage or clock speed used to process the reference signals received in the second TTI is predefined.

Processor 825 may also process at least the portion of the data to transmit in the second TTI using the determined voltage or clock speed. In some cases, the first TTI and the second TTI include a same TTI and determining the voltage or clock speed includes determining the voltage or clock speed for processing at least the portion of the data to transmit in the same TTI. In such cases, processor 825 may process control information and reference signals received in the same TTI using a first voltage or clock speed, and processor 825 may process at least the portion of the data to transmit in the same TTI using a second voltage or clock speed, the second voltage or clock speed being the determined voltage or clock speed. In some cases, processor 825 may process reference signals received in the second TTI using a voltage or clock speed different from the determined voltage or clock speed, channel estimation manager 845 may perform channel estimation based on the processed reference signals, and processor 825 may process at least the portion of the data to transmit in the second TTI using the determined voltage or clock speed based on the channel estimation. In some cases, channel state manager 850 may perform channel state measurements based on the processed reference signals, and processor 825 may process uplink control information to transmit in the second TTI using the determined voltage or clock speed based on the channel state measurements, where the uplink control information includes CSI feedback. In some cases, the uplink control information may include HARQ feedback.

Clock speed manager 820 may also receive an indication to use multiple processing voltages or clock speeds in processing control information and data in a TTI. In some cases, clock speed manager 820 may receive the indication to use multiple processing voltages or clock speeds in processing control information and data in the TTI when a response time for providing HARQ feedback on the data received in the TTI is below a threshold. In some cases, clock speed manager 820 may receive the indication to use multiple processing voltages or clock speeds in processing control information and data in the TTI when reference signals received in the TTI are received in or after a certain symbol of the TTI. In some cases, clock speed manager 820 may receive the indication to use multiple processing voltages or clock speeds in processing control information and data in the TTI when a processing time scheduled for processing the data in the TTI is below a threshold.

Processor 825 may then process, in accordance with the indication, at least a portion of the data received in the TTI using a different voltage or clock speed from an initial voltage or clock speed used to process the control information. In some cases, processor 825 may process control information and reference signals received in the TTI using the initial voltage or clock speed and process at least the portion of the data received in the TTI using the different voltage or clock speed. In some cases, channel estimation manager 845 may perform channel estimation based on the processed reference signals, and processor 825 may process at least the portion of the data received in the TTI using the different voltage or clock speed based on the channel estimation.

In some cases, data manager 830 may identify data to transmit in the TTI. Processor 825 may then process, in accordance with the indication, at least a portion of the data to transmit in the TTI using a different voltage or clock speed from an initial voltage or clock speed used to process the control information. In some cases, processor 825 may process control information and reference signals received in the TTI using the initial voltage or clock speed, and processor 825 may process at least the portion of the data to transmit in the TTI using the different voltage or clock speed. In some cases, channel estimation manager 845 may perform channel estimation based on the processed reference signals, and processor 825 may process at least the portion of the data to transmit in the TTI using the different voltage or clock speed based on a channel estimation.

Figure 9:
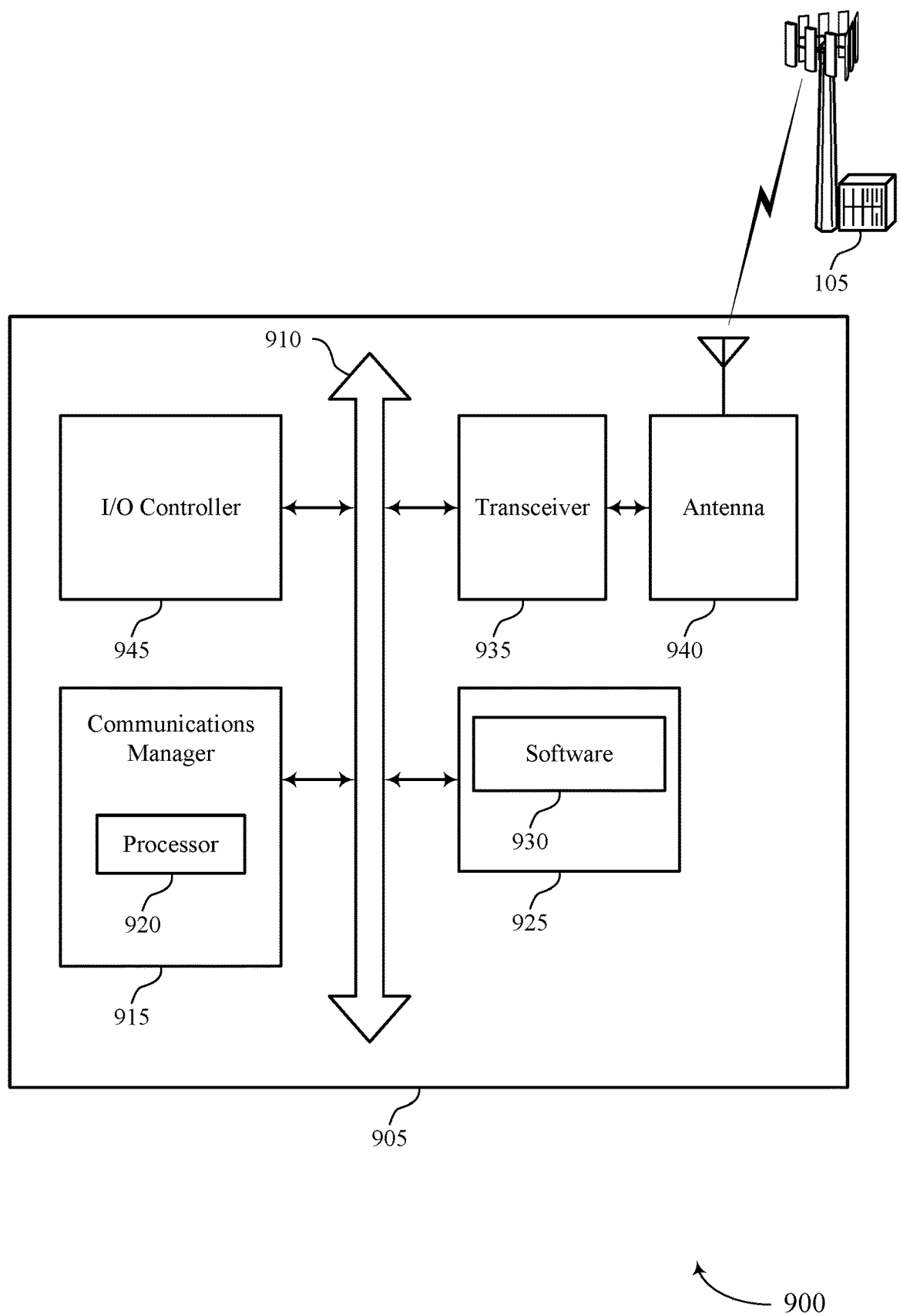
FIG. 9 illustrates a block diagram of a system including a user equipment (UE) that supports dynamic clock switching within a TTI in accordance with aspects of the present disclosure.

FIG. 9 shows a diagram of a system 900 including a device 905 that supports dynamic clock switching within a TTI in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support dynamic clock switching within a TTI. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in other cases, the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
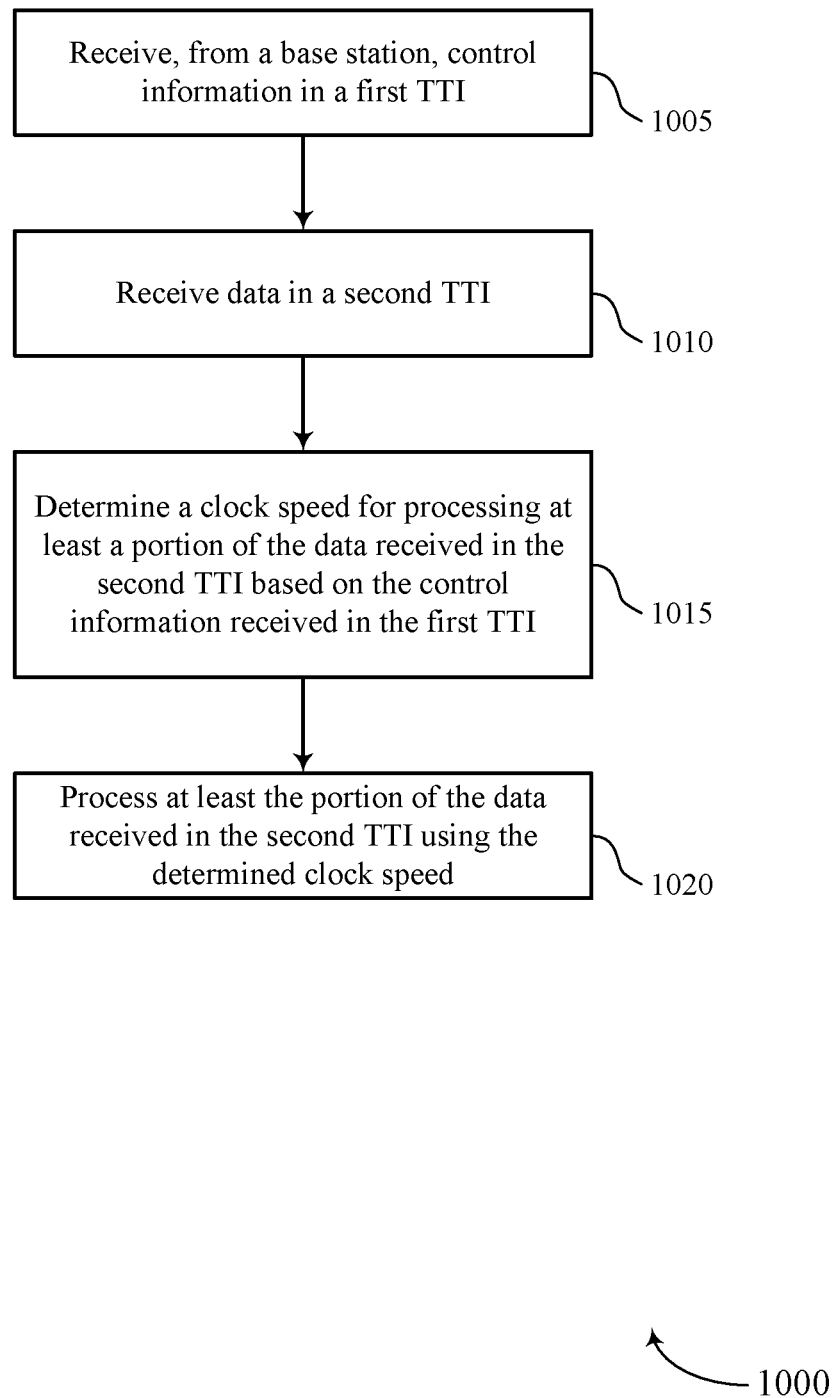
FIGS. 10-13 illustrate methods for dynamic clock switching within a TTI in accordance with aspects of the present disclosure.

FIG. 10 shows a flowchart illustrating a method 1000 for dynamic clock switching within a TTI in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At block 1005 the UE 115 may receive, from a base station, control information in a first TTI. The operations of block 1005 may be performed according to the methods described herein. In certain examples, aspects of the operations of block 1005 may be performed by a receiver as described with reference to FIGS. 6 through 9.

At block 1010 the UE 115 may receive data in a second TTI. The operations of block 1010 may be performed according to the methods described herein. In certain examples, aspects of the operations of block 1010 may be performed by a receiver as described with reference to FIGS. 6 through 9.

At block 1015 the UE 115 may determine a clock speed for processing at least a portion of the data received in the second TTI based at least in part on the control information received in the first TTI, the clock speed being associated with additional power consumption at the UE 115 in the second TTI compared to the first TTI. The operations of block 1015 may be performed according to the methods described herein. In certain examples, aspects of the operations of block 1015 may be performed by a clock speed manager as described with reference to FIGS. 6 through 9.

At block 1020 the UE 115 may process at least the portion of the data received in the second TTI using the determined clock speed. The operations of block 1020 may be performed according to the methods described herein. In certain examples, aspects of the operations of block 1020 may be performed by a processor as described with reference to FIGS. 6 through 9.

Figure 11:
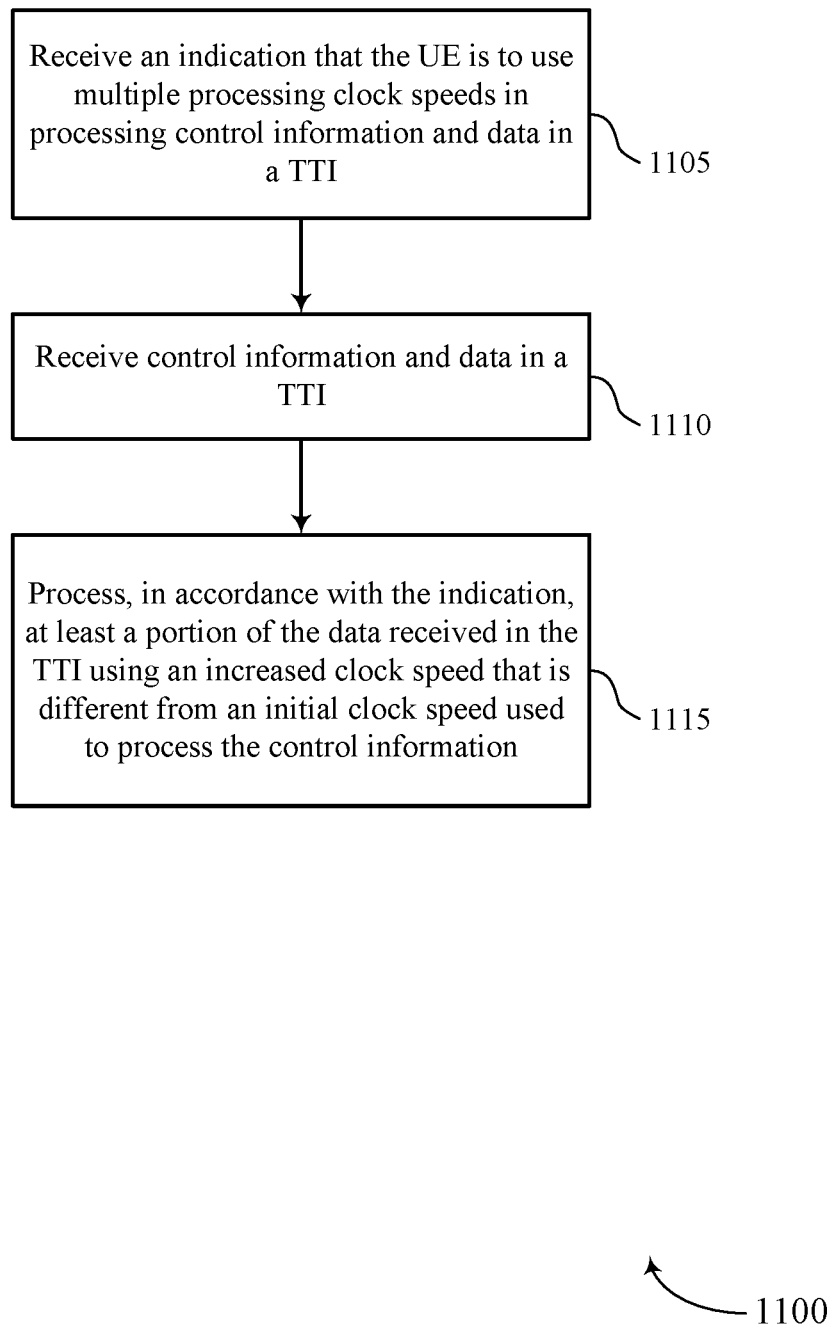

FIG. 11 shows a flowchart illustrating a method 1100 for dynamic clock switching within a TTI in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At block 1105 the UE 115 may receive an indication that the UE is to use multiple processing clock speeds in processing control information and data in a TTI. The operations of block 1105 may be performed according to the methods described herein. In certain examples, aspects of the operations of block 1105 may be performed by a clock speed manager as described with reference to FIGS. 6 through 9.

At block 1110 the UE 115 may receive control information and data in a TTI. The operations of block 1110 may be performed according to the methods described herein. In certain examples, aspects of the operations of block 1110 may be performed by a receiver as described with reference to FIGS. 6 through 9.

At block 1115 the UE 115 may process, in accordance with the indication, at least a portion of the data received in the TTI using an increased clock speed that is different from an initial clock speed used to process the control information. The operations of block 1115 may be performed according to the methods described herein. In certain examples, aspects of the operations of block 1115 may be performed by a processor as described with reference to FIGS. 6 through 9.

Figure 12:
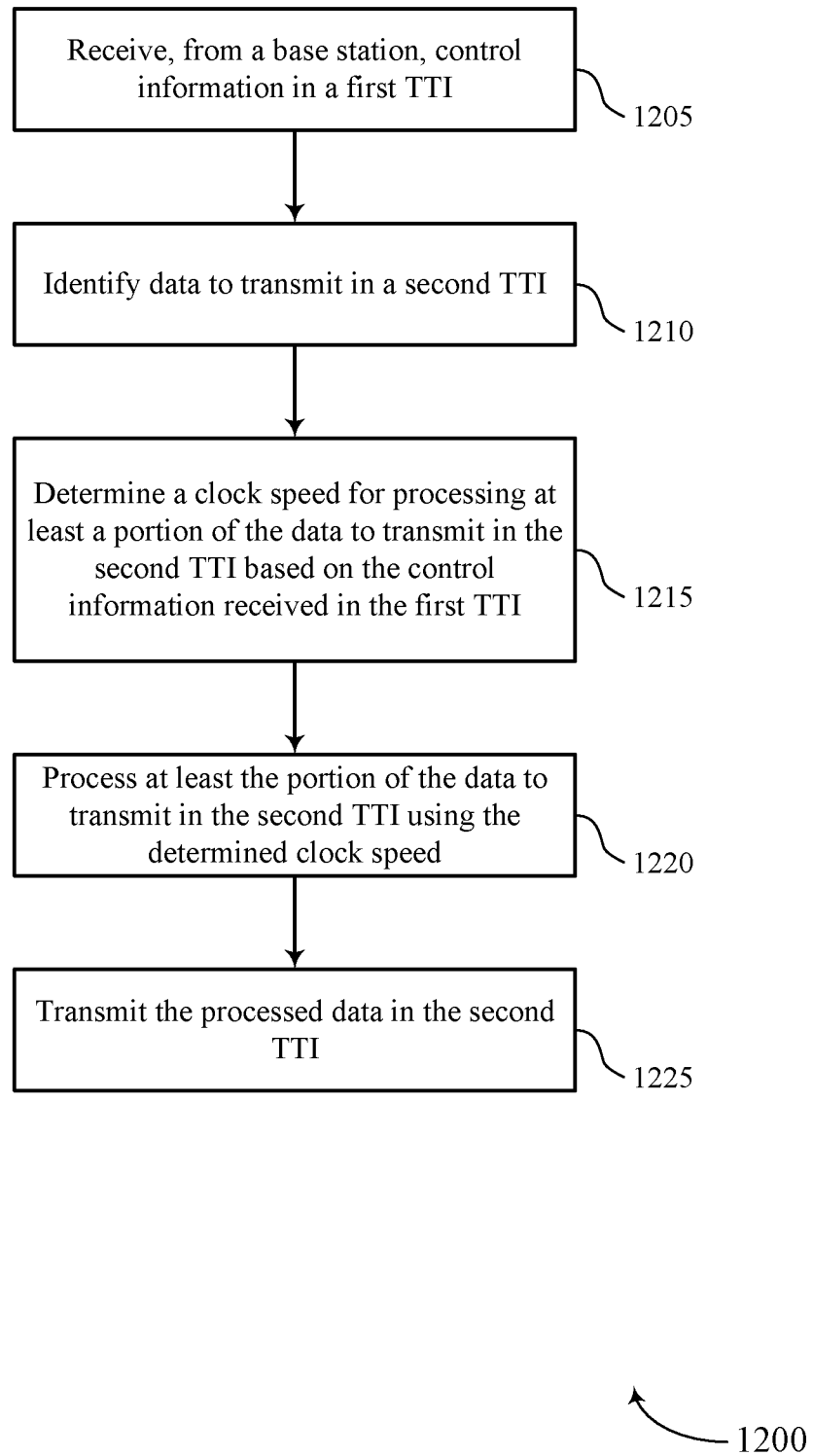

FIG. 12 shows a flowchart illustrating a method 1200 for dynamic clock switching within a TTI in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At block 1205 the UE 115 may receive, from a base station, control information in a first TTI. The operations of block 1205 may be performed according to the methods described herein. In certain examples, aspects of the operations of block 1205 may be performed by a receiver as described with reference to FIGS. 6 through 9.

At block 1210 the UE 115 may identify data to transmit in a second TTI. The operations of block 1210 may be performed according to the methods described herein. In certain examples, aspects of the operations of block 1210 may be performed by a data manager as described with reference to FIGS. 6 through 9.

At block 1215 the UE 115 may determine a clock speed for processing at least a portion of the data to transmit in the second TTI based at least in part on the control information received in the first TTI, the clock speed being associated with additional power consumption at the UE in the second TTI compared to the first TTI. The operations of block 1215 may be performed according to the methods described herein. In certain examples, aspects of the operations of block 1215 may be performed by a clock speed manager as described with reference to FIGS. 6 through 9.

At block 1220 the UE 115 may process at least the portion of the data to transmit in the second TTI using the determined clock speed. The operations of block 1220 may be performed according to the methods described herein. In certain examples, aspects of the operations of block 1220 may be performed by a processor as described with reference to FIGS. 6 through 9.

At block 1225 the UE 115 may transmit the processed data in the second TTI. The operations of block 1225 may be performed according to the methods described herein. In certain examples, aspects of the operations of block 1225 may be performed by a transmitter as described with reference to FIGS. 6 through 9.

Figure 13:
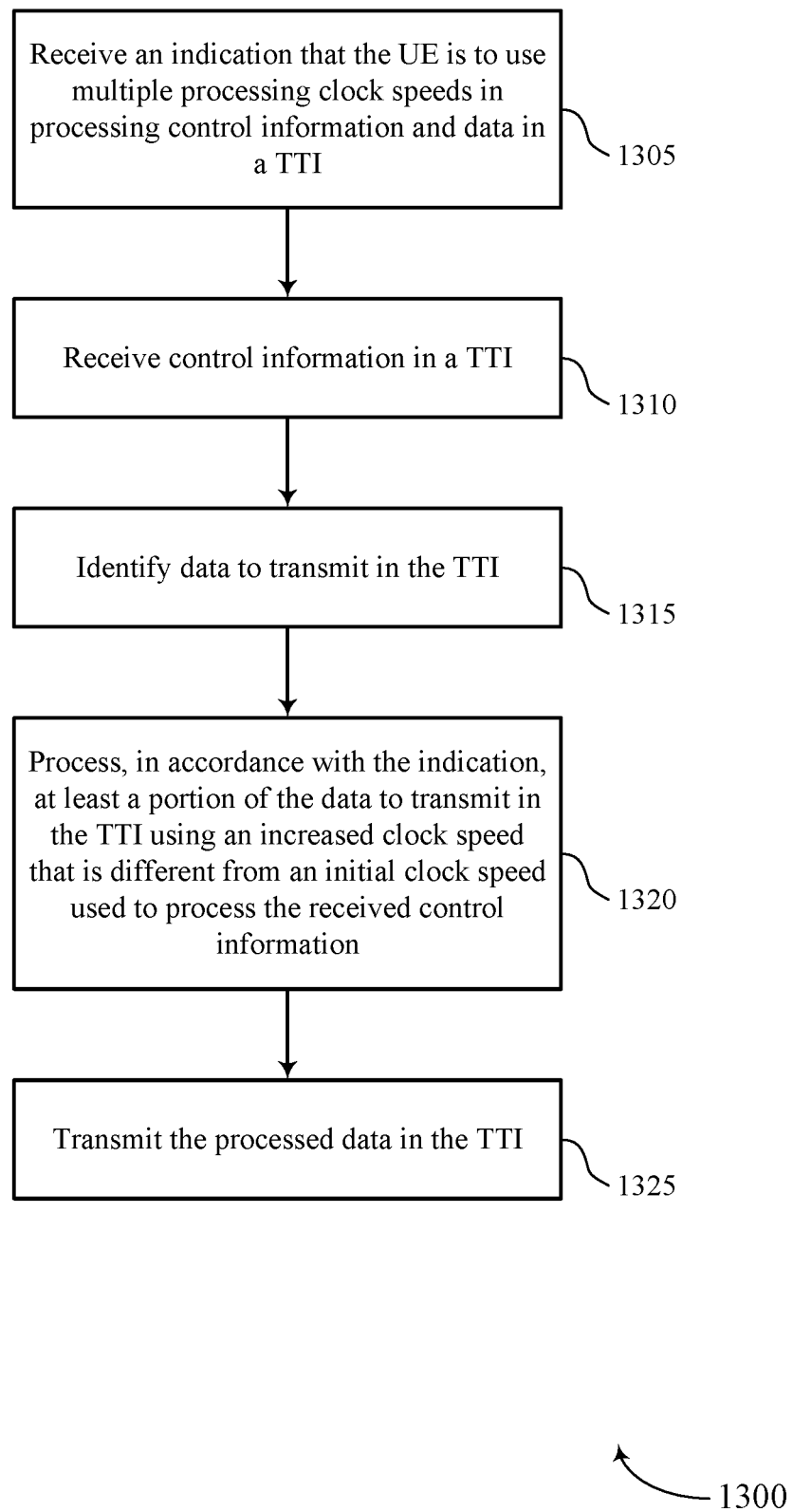

FIG. 13 shows a flowchart illustrating a method 1300 for dynamic clock switching within a TTI in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At block 1305 the UE 115 may receive an indication that the UE is to use multiple processing clock speeds in processing control information and data in a TTI. The operations of block 1305 may be performed according to the methods described herein. In certain examples, aspects of the operations of block 1305 may be performed by a clock speed manager as described with reference to FIGS. 6 through 9.

At block 1310 the UE 115 may receive control information in a TTI. The operations of block 1310 may be performed according to the methods described herein. In certain examples, aspects of the operations of block 1310 may be performed by a receiver as described with reference to FIGS. 6 through 9.

At block 1315 the UE 115 may identify data to transmit in the TTI. The operations of block 1315 may be performed according to the methods described herein. In certain examples, aspects of the operations of block 1315 may be performed by a data manager as described with reference to FIGS. 6 through 9.

At block 1320 the UE 115 may process, in accordance with the indication, at least a portion of the data to transmit in the TTI using an increased clock speed that is different from an initial clock speed used to process the received control information. The operations of block 1320 may be performed according to the methods described herein. In certain examples, aspects of the operations of block 1320 may be performed by a processor as described with reference to FIGS. 6 through 9.

At block 1325 the UE 115 may transmit the processed data in the TTI. The operations of block 1325 may be performed according to the methods described herein. In certain examples, aspects of the operations of block 1325 may be performed by a transmitter as described with reference to FIGS. 6 through 9.

It should be noted that the methods described above describe possible implementations, and that the operations and the steps may be rearranged or otherwise modified and that other implementations are possible. Further, aspects from two or more of the methods may be combined. Using the techniques described above, UEs 115 and base stations 105 may dynamically adjust a clock speed for processing signals within a TTI or across TTIs (e.g., using a clock speed manager) or determine an updated clock speed for processing signals within a TTI or across TTIs such that the devices may be able to limit power consumption when appropriate.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving control information in a first transmission time interval (TTI);
   receiving data in a second TTI;
   determining a voltage or clock speed for processing at least a portion of the data received in the second TTI based at least in part on the control information received in the first TTI, the voltage or clock speed being associated with a change in power consumption in the second TTI compared to the first TTI; and
   processing at least the portion of the data received in the second TTI using the determined voltage or clock speed.

2. The method of claim 1, wherein determining the voltage or clock speed for processing at least the portion of the data received in the second TTI further comprises:
   determining that the control information indicates a location of reference signals in the second TTI; and
   determining the voltage or clock speed for processing at least the portion of the data received in the second TTI based at least in part on the location of the reference signals in the second TTI.

3. The method of claim 1, wherein determining the voltage or clock speed for processing at least the portion of the data received in the second TTI further comprises:
   determining that the control information indicates a response time for providing hybrid automatic repeat request (HARQ) feedback on the data received in the second TTI; and
   determining the voltage or clock speed for processing at least the portion of the data received in the second TTI based at least in part on the response time.

4. The method of claim 1, wherein the determined voltage or clock speed is different from a voltage or clock speed used to process the control information.

5. The method of claim 1, wherein the determined voltage or clock speed is greater than or lower than a voltage or clock speed used to process the control information received in the first TTI.

6. The method of claim 1, wherein the determined voltage or clock speed is greater than or lower than a voltage or clock speed used to process reference signals received in the second TTI.

7. The method of claim 1, wherein the first TTI and the second TTI comprise a same TTI, and wherein determining the voltage or clock speed comprises determining the voltage or clock speed for processing at least the portion of the data received in the same TTI.

8. The method of claim 7, further comprising:
   processing control information and reference signals received in the same TTI using a first voltage or clock speed; and
   processing at least the portion of the data received in the same TTI using a second voltage or clock speed, the second voltage or clock speed being the determined voltage or clock speed.

9. The method of claim 1, further comprising:
   processing reference signals received in the second TTI using a voltage or clock speed different from the determined voltage or clock speed;
   performing channel estimation based at least in part on the processed reference signals; and
   processing at least the portion of the data received in the second TTI using the determined voltage or clock speed based at least in part on the channel estimation.

10. A device for wireless communication, comprising:
    a processor;
    memory coupled with the processor; and
    instructions stored in the memory and operable, when executed by the processor, to cause the device to:
    receive control information in a first transmission time interval (TTI);
    receive data in a second TTI;
    determine a voltage or clock speed for processing at least a portion of the data received in the second TTI based at least in part on the control information received in the first TTI, the voltage or clock speed being associated with a change in power consumption at the device in the second TTI compared to the first TTI; and
    process at least the portion of the data received in the second TTI using the determined voltage or clock speed.

11. The device of claim 10, wherein the instructions are further executable by the processor to cause the device to:
    determine that the control information indicates a location of reference signals in the second TTI; and
    determine the voltage or clock speed for processing at least the portion of the data received in the second TTI based at least in part on the location of the reference signals in the second TTI.

12. The device of claim 10, wherein the instructions are further executable by the processor to cause the device to:
    determine that the control information indicates a response time for providing hybrid automatic repeat request (HARQ) feedback on the data received in the second TTI; and
    determine the voltage or clock speed for processing at least the portion of the data received in the second TTI based at least in part on the response time.

13. The device of claim 10, wherein the determined voltage or clock speed is greater than or lower than a voltage or clock speed used to process the control information received in the first TTI.

14. The device of claim 10, wherein the determined voltage or clock speed is greater than or lower than a voltage or clock speed used to process reference signals received in the second TTI.

15. The device of claim 10, wherein the first TTI and the second TTI comprise a same TTI, and wherein determining the voltage or clock speed comprises determining the voltage or clock speed for processing at least the portion of the data received in the same TTI.

16. A method for wireless communication, comprising:
    receiving control information in a first transmission time interval (TTI);

identifying data to transmit in a second TTI;
determining a voltage or clock speed for processing at least a portion of the data to transmit in the second TTI based at least in part on the control information received in the first TTI, the voltage or clock speed being associated with a change in power consumption in the second TTI compared to the first TTI;
processing at least the portion of the data to transmit in the second TTI using the determined voltage or clock speed; and
transmitting the processed data in the second TTI.

17. The method of claim 16, wherein determining the voltage or clock speed for processing at least the portion of the data to transmit in the second TTI further comprises:
determining that the control information indicates a processing time for processing data to transmit in the second TTI; and
determining the voltage or clock speed for processing at least the portion of the data to transmit in the second TTI based at least in part on the indicated processing time.

18. The method of claim 16, wherein determining the voltage or clock speed for processing at least the portion of the data to transmit in the second TTI further comprises:
determining that the control information indicates a location of reference signals in the second TTI; and
determining the voltage or clock speed for processing at least the portion of the data to transmit in the second TTI based at least in part on the location of the reference signals in the second TTI.

19. The method of claim 16, wherein the determined voltage or clock speed is greater than or lower than a voltage or clock speed used to process the control information received in the first TTI.

20. The method of claim 16, wherein the determined voltage or clock speed is greater than or lower than a voltage or clock speed used to process reference signals received in the second TTI.

21. The method of claim 16, wherein the first TTI and the second TTI comprise a same TTI, and wherein determining the voltage or clock speed comprises determining the voltage or clock speed for processing at least the portion of the data to transmit in the same TTI.

22. The method of claim 21, further comprising:
processing control information and reference signals received in the same TTI using a first voltage or clock speed; and
processing at least the portion of the data to transmit in the same TTI using a second voltage or clock speed, the second voltage or clock speed being the determined voltage or clock speed.

23. The method of claim 16, further comprising:
processing reference signals received in the second TTI using a voltage or clock speed different from the determined voltage or clock speed;
performing channel estimation based at least in part on the processed reference signals; and
processing at least the portion of the data to transmit in the second TTI using the determined voltage or clock speed based at least in part on the channel estimation.

24. The method of claim 23, further comprising:
performing channel state measurements based at least in part on the processed reference signals; and
processing uplink control information to transmit in the second TTI using the determined voltage or clock speed based at least in part on the channel state measurements, wherein the uplink control information comprises channel state information (CSI) feedback.

25. The method of claim 24, wherein the uplink control information further comprises hybrid automatic repeat request (HARQ) feedback.

26. A device for wireless communication, comprising:
a processor;
memory coupled with the processor; and
instructions stored in the memory and operable, when executed by the processor, to cause the device to:
receive control information in a first transmission time interval (TTI);
identify data to transmit in a second TTI;
determine a voltage or clock speed for processing at least a portion of the data to transmit in the second TTI based at least in part on the control information received in the first TTI, the voltage or clock speed being associated with a change in power consumption at the device in the second TTI compared to the first TTI;
process at least the portion of the data to transmit in the second TTI using the determined voltage or clock speed; and
transmit the processed data in the second TTI.

27. The device of claim 26, wherein the instructions are further executable by the processor to cause the device to:
determine that the control information indicates a processing time for processing data to transmit in the second TTI; and
determine the voltage or clock speed for processing at least the portion of the data to transmit in the second TTI based at least in part on the indicated processing time.

28. The device of claim 26, wherein the instructions are further executable by the processor to cause the device to:
determine that the control information indicates a location of reference signals in the second TTI; and
determine the voltage or clock speed for processing at least the portion of the data to transmit in the second TTI based at least in part on the location of the reference signals in the second TTI.

29. The device of claim 26, wherein the determined voltage or clock speed is greater than or lower than a voltage or clock speed used to process the control information received in the first TTI.

30. The device of claim 26, wherein the determined voltage or clock speed is greater than or lower than a voltage or clock speed used to process reference signals received in the second TTI.

\* \* \* \* \*